(12) United States Patent
Karpov et al.

(10) Patent No.: US 12,325,830 B2
(45) Date of Patent: Jun. 10, 2025

(54) ROTARY FEEDSTOCK PROCESSING APPARATUS WITH AN AXIALLY ADJUSTABLE ROTOR

(71) Applicant: Coolbrook Oy, Helsinki (FI)

(72) Inventors: Alexander Karpov, Helsinki (FI); Denis Semenov, Helsinki (FI)

(73) Assignee: COOLBROOK OY, Helsinki (FI)

( * ) Notice: Subject to any disclaimer, the term of this patent is extended or adjusted under 35 U.S.C. 154(b) by 158 days.

(21) Appl. No.: 18/254,414

(22) PCT Filed: Nov. 17, 2021

(86) PCT No.: PCT/FI2021/050777
§ 371 (c)(1),
(2) Date: May 25, 2023

(87) PCT Pub. No.: WO2022/106754
PCT Pub. Date: May 27, 2022

(65) Prior Publication Data
US 2024/0101910 A1    Mar. 28, 2024

(30) Foreign Application Priority Data
Nov. 18, 2020  (FI) ..................... 20206172

(51) Int. Cl.
*C10G 11/10*   (2006.01)
*B01J 19/18*   (2006.01)
*C10G 3/00*    (2006.01)

(52) U.S. Cl.
CPC ........... *C10G 11/10* (2013.01); *B01J 19/1806* (2013.01); *C10G 3/42* (2013.01)

(58) Field of Classification Search
CPC ........ B01J 6/008; B01J 19/18; B01J 19/1806; B01J 2219/00189; C10G 3/40; C10G 3/42; C10G 9/00; C10G 11/00; C10G 11/10; Y02P 30/20
See application file for complete search history.

(56) References Cited

U.S. PATENT DOCUMENTS

| 4,288,405 A | 9/1981 | Koch |
| 2012/0020841 A1* | 1/2012 | Bushuev ................ F01D 5/142 422/129 |
| 2020/0114332 A1 | 4/2020 | Xu et al. |

OTHER PUBLICATIONS

International Search Report and Written Opinion, PCT/FI2021/050777, dated Jan. 21, 2022 (12 pp.).

* cited by examiner

*Primary Examiner* — Brian A McCaig
(74) *Attorney, Agent, or Firm* — Eversheds Sutherland (US) LLP

(57) ABSTRACT

A rotary bladed apparatus (100) for processing feedstocks in a process fluid is provided, said apparatus comprises means for adjusting position of a working blade cascade of the rotor (3) relative to stator components (2, 4) in a longitudinal direction of a rotor shaft (1). Adjustment is performed through axial displacement of the rotor (3) or, alternatively, through axial displacement of the reactor housing (22 A, 32A). A method for improving process efficiency and for regulating flow losses during processing of feedstocks in a process fluid, in particular, in off-design conditions in the bladed apparatus (100) is further provided. In embodiments, processing of feedstocks includes thermal- or thermochemical cracking of hydrocarbon-containing feedstock.

30 Claims, 11 Drawing Sheets

A.

B.

C.

ROTARY FEEDSTOCK PROCESSING APPARATUS WITH AN AXIALLY ADJUSTABLE ROTOR

CROSS-REFERENCE TO RELATED APPLICATIONS

This application is the U.S. national stage of PCT/FI2021/050777, filed Nov. 17, 2021, which claims priority to Finnish Application No. 20206172, filed Nov. 18, 2020, both of which are incorporated by reference herein.

FIELD OF THE INVENTION

The present invention generally relates to the field of rotary turbomachines with an axially adjustable rotor. In particular, the invention concerns a rotary bladed apparatus for processing feedstocks, such hydrocarbons, related arrangement, method and uses.

BACKGROUND

In the field of turbomachinery, a range of solutions exists to render a rotor unit displaceable in axial direction. These solutions are typically applicable in the axial-flow turbomachines, such as axial-flow vane compressors and turbines, wherein radial flow losses can be efficiently regulated through the axial displacement of the rotor. Radial flow losses are common in the annular turbine cascades that utilize working fluid to turn a rotor, because of provision of the clearance gaps between rotating and stationary components, which typically lead to leakage paths (tip leakages).

By way of example, DE 101 45 785 A1 (Ehrenberger) discloses a wind turbine, where the rotor is axially shifted from its operating position to the lower speed positions (into a direction of increased clearance between the rotor blades and the casing) when the rotors' nominal speed is exceeded. Axial adjustment solves a problem of stabilizing speed (revolution rates) of the rotor in conditions of variable velocity of incoming fluid flow.

None of the above-referenced solutions provide any indication on suitability of disclosed turbomachinery in the field of chemical processing. An example of an axial-type reactor configured for hydrogenation of dry coal to produce hydrocarbons with a rotor configured for axial displacement is presented in U.S. Pat. No. 4,288,405 (Koch). The rotor is axially displaced in an event the pressure in the hydrogenation chamber exceeds a particular value. Movement of the rotor causes closing of a feed inlet into the hydrogenation chamber, thus preventing spreading the very high pressure into the upstream appliances.

U.S. Pat. No. 9,494,038 (Bushuev) and U.S. Pat. No. 9,234,140 (Seppala et al) disclose rotodynamic reactor (RDR) apparatuses for converting hydrocarbon feedstocks into light olefins via thermo(chemical) cracking. Overall, the reactor comprises a rotor disk with associated blade cascade disposed between the rows of stationary vanes arranged on essentially ring-shaped supports and enclosed within a casing provided in the shape of a toroid. Process fluid enters the reaction via the inlet and passes through the stator and rotor cascades several times according to essentially helical trajectory prior to exiting the reactor.

Low-molecular olefins, such as ethylene, propylene and butylenes, are primary components of petrochemical industry and serve as a basic building blocks in commercial production of plastics, polymers, elastomers, rubbers, foams, solvents, and chemical intermediates, as well as of fibers, including carbon fibers, and coatings. In comparison with conventional tubular pyrolysis furnaces, the abovementioned rotodynamic machines allow for conducting thermos (chemical) reactions with shortened residence times and improved controllability of the cracking process, the latter being generally associated with enhanced yields of the target products along with preventing said products from entering secondary reactions.

A common problem with said known RDR solutions is generation of flow leakages along a circumferential direction (also referred to as tangential or hoop direction). In practice, the leakages occur in a direction from inlet to exit (instead of entering the reaction zone) and/or in a direction from the end of the reaction zone to the beginning of an adjacent reaction zone (instead of exiting the reactor), said leakages caused by operating the reactor under the conditions different from nominal ones (in a so called off-design mode).

For the sake of completeness, we note that the problem with leakages in the above indicated directions (inlet-to-exit; end of the reaction zone—beginning of the adjacent reaction zone) are not encountered in the conventional axial-flow solutions.

Thus, upon operating the reactor at variable flow rates and/or feedstock-associated conditions, the leakages are unavoidable. In similar manner, leakages are generated upon modifying the temperature inside the reactor (all other parameters being constant), as being associated with adjusting rotational speed of the rotor.

Such leakage flow causes reduction of the total mass flow and work transfer and negatively affect stability of the reactor, which narrows its operating range, i.e. the capability to operate across a range of fluid flow rates and rotational speeds. Moreover, flow leakages cause coke formation and drastically reduce the yield of the target products. These negatively affect industrial applicability of the reactor, its attractiveness to the end user and the market potential, accordingly.

In practice, the only way to prevent leakages is operating the RDR apparatus with a sole combination of a mass flow rate through the reactor and rotational speed of the rotor, whereby a certain, predetermined rotational speed is assigned to a certain mass flow rate provided that feedstock composition is unchanged.

The solution proposed by Bushuev in U.S. Pat. No. 9,494,038 B2 suggests adjusting geometries of the stationary vane cascades in circumferential direction to achieve pressure equalization at the entrance into the rotor blade cascade and at the exit therefrom throughout the entire blade cascade, with the reactor operating under nominal design conditions. Additionally, positions of the stator vane cascades may be adjusted, but only in circumferential direction with regard to the rotor rotation axis. Mentioned arrangement aims at mitigating the undesired large-scale mixing between the adjacent streams. Nevertheless, publication does not address the problem of reducing leakages in off-design operational modes.

In this regard, an update in the field of improving efficiency of rotary reactor apparatuses for chemical processing of hydrocarbon feedstocks, in particular, those of RDR type, is still desired, in view of addressing challenges associated with preventing or at least minimizing flow leakages, in order to optimize operating range and efficiency of the reactor under variable process conditions.

SUMMARY OF THE INVENTION

An objective of the present invention is to solve or to at least alleviate each of the problems arising from the limitations and disadvantages of the related art. The objective is achieved by various embodiments of an apparatus for processing feedstocks in a process fluid, a related arrangement, methods and uses. Thereby, in one aspect of the invention, the apparatus for processing feedstocks in a process fluid is provided according to what is defined in the independent claim 1.

In embodiment, said apparatus comprises a rotor comprising a plurality of rotor blades arranged over a circumference of a disk mounted onto a rotor shaft and forming a rotor blade cascade; a plurality of stationary vanes arranged into essentially annular vane cascades adjacently disposed with regard to the rotor blade cascade such, as to form a stator-rotor-stator arrangement, and a casing, in which a duct is formed with at least one inlet and at least one exit, said casing enclosing the rotor blade cascade and the stationary vane cascades inside the duct, wherein position of the rotor blade cascade relative to stationary vane cascades in the stator-rotor-stator arrangement is adjustable in an axial direction along the rotor shaft by a predetermined distance ($\Delta X$).

In embodiment, position of the rotor blade cascade relative to stationary vane cascades in said stator-rotor-stator arrangement is adjustable through axially displacing the rotor in a longitudinal direction of the rotor shaft.

In embodiment, said apparatus further comprises at least one thrust bearing element arranged on the rotor shaft, wherein the rotor is rendered axially displaceable through axial displacement of said at least one thrust bearing element on the rotor shaft.

In embodiment, said at least one thrust bearing element is configured axially displaceable relative to the (reactor) casing.

In embodiment, the thrust bearing element is accommodated in a separate housing, which is enclosed, at least partly, inside a bearing block, wherein the encased thrust bearing element is configured axially displaceable in a longitudinal direction of the rotor shaft in the related bearing block.

In embodiment, a coupling arranged between the rotor shaft and a drive shaft is a flexible shaft coupling configured to render the drive shaft and/or the rotor shaft axially displaceable. Said flexible coupling thus enables axial displacement of the drive shaft and/or the rotor shaft.

In some embodiment, in said apparatus, the rotor is rendered axially displaceable through axial displacement of the drive shaft connected to the rotor shaft via the coupling.

In some embodiment, in said apparatus, position of the rotor blade cascade relative to stationary vane cascades in the stator-rotor-stator arrangement is adjustable through axially displacing at least one stationary component, in particular, the (reactor) casing, in a longitudinal direction of the rotor shaft. The drive shaft is preferably fixed, whereby its axial displacement is prevented.

In some further embodiment, the coupling arranged between the rotor shaft and a drive shaft is a rigid coupling configured to render the drive shaft and the rotor shaft axially non-displaceable.

In embodiment, each of the stationary vane cascades are secured on related bearing blocks arranged at both sides of the reactor (gas) casing.

In embodiment, the apparatus is configured such that adjusting position of the rotor blade cascade relative to stationary vane cascades in the stator-rotor-stator arrangement is accompanied with adjusting at least a rotation speed of the rotor and/or a flow rate of a feedstock-containing process fluid.

In embodiment, the apparatus further comprises a flow-shaping device arranged inside the (gas) casing in such a way that the duct is formed between the outer casing and the flow-shaping device, said duct has a ring-shaped meridional cross-section. In embodiment, said flow-shaping device is an annular, essentially hollow structure.

In embodiment, in said apparatus, a vaneless space is formed between an exit from the stator-rotor-stator arrangement and an entrance thereto, said vaneless space being defined by a volume between the (gas) casing and the flow-shaping device.

In embodiment, the stationary vane cascades are formed with a plurality of stationary nozzle guide vanes that form an annular nozzle guide vane cascade upstream the rotor blades and with a plurality of stationary diffuser vanes that form a diffuser vane cascade downstream the rotor blades.

In embodiment, the cascades in the stator-rotor-stator arrangement are configured to direct the process fluid to repetitively pass through said cascades and through the vaneless space in accordance with a helical flow path while propagating within the duct between the at least one inlet and at least one exit and to establish conditions for at least one chemical reaction to occur in the process fluid.

In embodiment, the apparatus further comprises a number of catalytic surfaces.

In some other aspects, use of said apparatus for processing feedstocks in a process fluid according to the embodiments is provided, in accordance to what is defined in the independent claims 19 and 20. In embodiment, said use is provided in thermal processing of hydrocarbon-containing feedstock(s). Additionally or alternatively, said use is provided for conducting chemical reactions. In embodiment, said use is provided for thermal- or thermochemical cracking of hydrocarbon-containing feedstock(s).

In embodiment, said use is provided for executing an at least one procedure selected from the group consisting of: processing hydrocarbon feedstock preferably containing medium and light weight hydrocarbon fractions; processing gasified carbohydrate-containing feedstock matter, processing gasified glyceride- and/or fatty acid-containing feedstock matter, and processing gasified cellulosic biomass material.

In another aspect, arrangement of said apparatus for processing feedstocks in a process fluid according to the embodiments is provided, in accordance to what is defined in the independent claim 23. In said arrangement, at least two apparatuses are at least functionally connected in parallel or in series.

In still another aspect, a method for improving process efficiency and for regulating flow losses during processing of feedstocks in a process fluid is provided, according to that is defined in the independent claim 24. In embodiment, the method comprises:
  obtaining an apparatus comprising: a rotor comprising a plurality of rotor blades arranged over a circumference of a disk mounted onto a rotor shaft and forming a rotor blade cascade; a plurality of stationary vanes arranged into annular vane cascades adjacently disposed with regard to the rotor blade cascade such, as to form a stator-rotor-stator arrangement; and a casing, in which a duct is formed with at least one inlet and at least one exit, said casing enclosing the rotor blade cascade and the stationary vane cascades inside the duct; and
  adjusting position of the rotor blade cascade relative to stationary vane cascades in the stator-rotor-stator arrangement in an axial direction along the rotor shaft by a predetermined distance ($\Delta X$).

In embodiment, position of the rotor blade cascade relative to stationary vane cascades in said stator-rotor-stator arrangement is adjusted through axially displacing the rotor in a longitudinal direction of the rotor shaft.

In another embodiment, position of the rotor blade cascade relative to stationary vane cascades in the stator-rotor-stator arrangement is adjusted through axially displacing at least one stationary component, in particular, the casing, in a longitudinal direction of the rotor shaft.

The utility of the present invention arises from a variety of reasons depending on each particular embodiment thereof. By providing a rotor displaceable in axial direction (viz., in a longitudinal direction of a rotor shaft), tip-clearance leakage—associated flow losses characteristic to known rotary-type reactors and/or turbomachines can be effectively prevented or at least minimized. In conventional rotary reactors, flow leakages trigger a range of secondary reactions leading to formation of the side products, such as coke, and reduce the yields of the primary (target) products.

The invention has proved particularly useful in attempts to operate the rotary reactor apparatus designed for conducting (thermo)chemical reactions, such as (steam) cracking of hydrocarbons, in off-design mode, established upon modifying a range of parameters in the reactor (e.g. process temperature, which is often associated with adjusting rotational speed of the rotor, and/or chemical composition of the feedstock). The solution offered hereby may be indispensable for use in a cracking facility or in any other related facility operating with varying feedstocks, for example.

By utilizing the displaceable rotor solution, operation of a conventional rotary reactor device can be optimized, in terms of at least efficiency, for a plurality of operating conditions different from that assigned to a design model. The operating range of the reactor and the associated facility, e.g. a cracker unit, can be extended, accordingly.

The rotor displacement solution is flexible and it can be efficiently utilized in the apparatuses designed for (thermo) chemical feedstock processing (RDR solutions, axial-flow solutions, etc.), as well as in rotary turbomachines.

The terms "pyrolysis" and "cracking" are utilized in this disclosure largely as synonyms regarding the process of thermal degradation of heavier hydrocarbon-containing compounds to lighter hydrocarbon-containing compounds.

The expression "a number of" refers hereby to any positive integer starting from one (1), e.g. to one, two, or three. The expression "a plurality of" refers hereby to any positive integer starting from two (2), e.g. to two, three, or four.

The terms "first" and "second", are used hereby to merely distinguish an element from another element without indicating any particular order or importance, unless explicitly stated otherwise.

The terms "fluid" and "process fluid" refer, in the present disclosure, largely to a gaseous matter, such as e.g. gaseous feedstock stream guided through the interior of the reactor apparatus, preferably, in the presence of diluent.

The term "gasified" is utilized herein to indicate matter being converted into a gaseous form by any possible means.

The term "hydrodynamic" is utilized herein to indicate the dynamics of fluids, which are, in this disclosure, largely represented by gases. Therefore, said term is utilized in this disclosure as a synonym to the term "gas-dynamic".

Different embodiments of the present invention will become apparent by consideration of the detailed description and accompanying drawings.

DETAILED DESCRIPTION OF THE EMBODIMENTS

Figure 1:
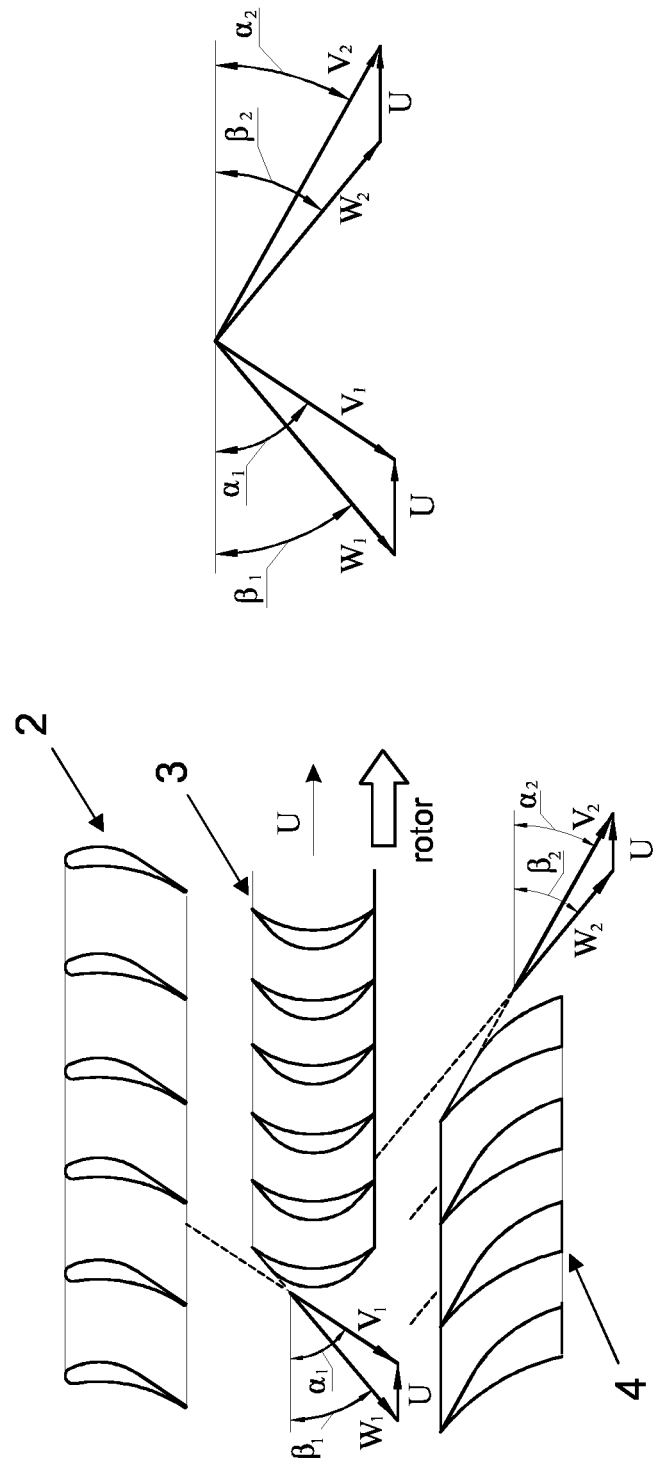
FIG. 1 shows a stator-rotor-stator arrangement in an apparatus 100, operating under design conditions.

Detailed embodiments of the present invention are disclosed herein with the reference to accompanying drawings. The same reference characters are used throughout the drawings to refer to same members.

Figure 6A:
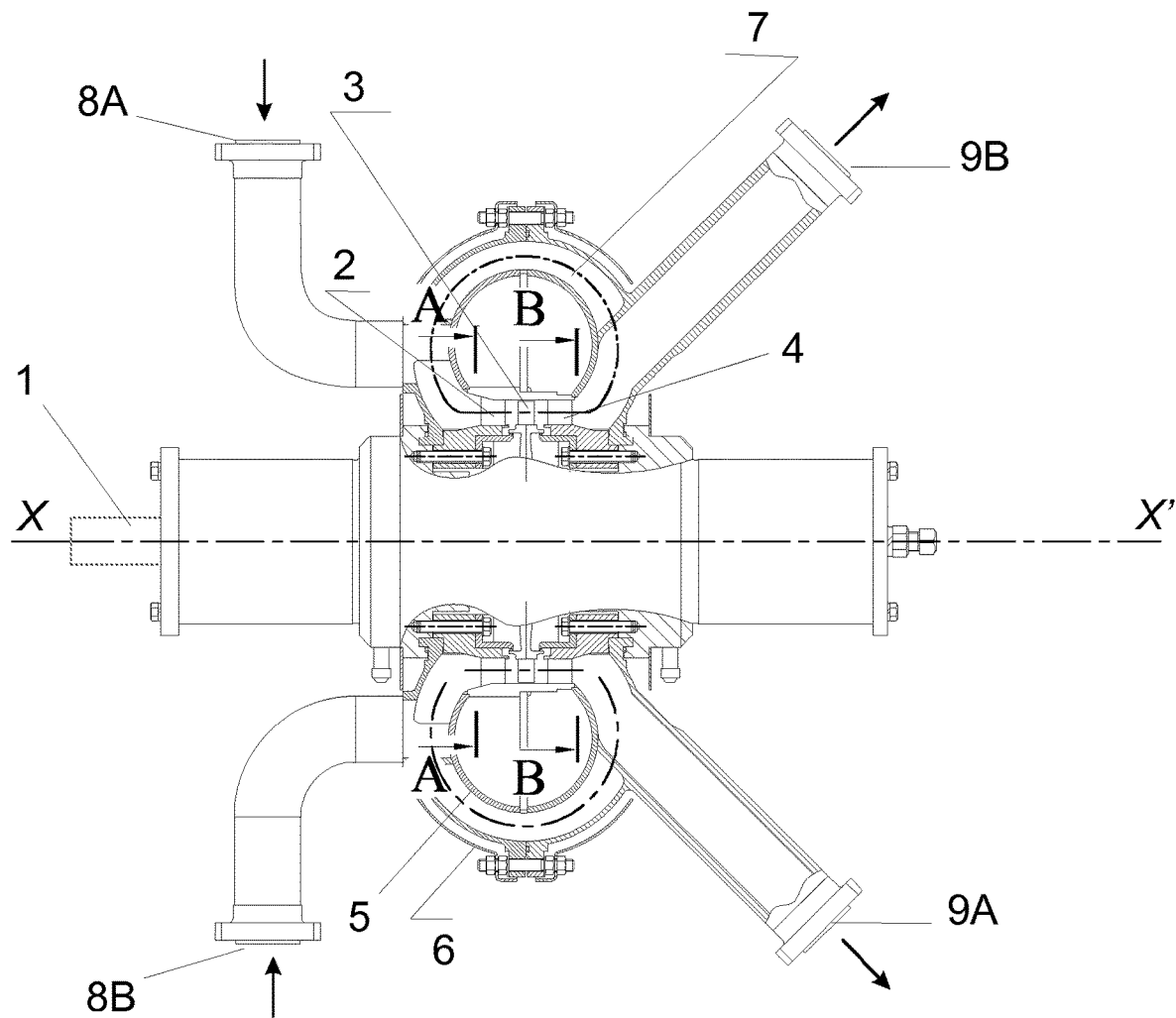
FIG. 6A is a vertical crosscut of the apparatus 100, according to an embodiment.

FIG. 6A illustrates at 100 a concept underlying various embodiments of a reactor apparatus for processing feedstocks in a process fluid (working fluid), hereafter, the reactor. FIGS. 8A-8C and FIG. 9 illustrate the reactor 100 (100A, 100B, 100C), according to the embodiments.

Implementation of the apparatus 100 generally follows the guidelines set up in the U.S. Pat. No. 9,494,038 (Bushuev) and U.S. Pat. No. 9,234,140 (Seppälä et al) incorporated herein by reference and describing rotary turbomachine type reactors, in which both the rotor- and the stator structures are enclosed in the essentially toroidal housing.

The reactor 100 is preferably configured for processing feedstocks, such as hydrocarbon-containing feedstocks, via conducting at least one chemical reaction in the process fluid, whereupon the feedstock is converted into desired products.

In selected configurations, the reactor is configured for thermal- or thermochemical conversion of hydrocarbon-containing feedstock, in particular, fluidized hydrocarbon-containing feedstock. By "hydrocarbon-containing feedstock" we refer hereby to fluidized organic feedstock matter that primarily comprises carbon- and hydrogen. In some instances, however, the reactor can be configured to process oxygen-containing feedstock matter, such as oxygen-containing hydrocarbon derivatives, cellulose-based feedstock and/or vegetable oil-based feedstocks. Applicability of the reactor proposed hereby thus extends beyond the limits imposed by conventional definition of hydrocarbon feedstocks.

Hydrocarbon-containing feed that enters the reactor is provided in essentially fluidic form, such as liquid or gas. In preferred configurations, the reactor 100 is designed for processing gasified feedstock, wherein the process fluid is provided in a gaseous form. In alternative configurations, processing of essentially liquid feedstock matter is not excluded.

The reactor apparatus 100 is thus adapted for use in thermal processing of hydrocarbon-containing feedstocks. Thermal processing is preferably accompanied with conversion of said feedstocks into desired product(s), whereby conditions are established for at least one chemical reaction to occur in the process fluid. Alternatively, the process conditions in the apparatus 100 may be adjusted such, that during said thermal processing, conditions for chemical changes (reactions) are not established, whereby the apparatus is rendered with a (pre)heater functionality.

In embodiments, the apparatus 100 is adapted for thermal and/or thermochemical hydrocarbon degradation reactions, such as pyrolysis reactions, collectively resulting in cracking of hydrocarbon-containing feedstock and optionally assisted by the dilution medium (diluent). The reactor 100 can thus be adapted for pyrolysis reactions with or without the dilution medium. Still, presence of the dilution medium is preferable as it improves product yields.

The reactor 100 can be configured to receive feedstock diluted by an at least one diluent, preferably a gaseous diluent, such as (water) steam. In steam cracking processes, steam as a diluent is preferred, as it lowers the hydrocarbon partial pressure in order to suppress or to reduce the formation of coke deposits by gasification reaction(s). In some instances, the diluent is inert gaseous medium, such as hydrogen ($H_2$), nitrogen ($N_2$) or argon, for example, that possesses essentially zero reactivity towards the reactants and the reaction products. Utilization of any other suitable diluent is not excluded. In some instances, dilution is used to reduce partial pressure and to increase the efficiency of the cracking reaction in favour of desired olefin (e.g. ethylene and propylene) production. In some other instances, the reactor 100 can be operated without diluent.

In some configurations, the apparatus 100 is a steam cracking reactor.

The reactor 100 comprises a rotor system, hereafter, a rotor, comprising a shaft 1 positioned along a horizontal (longitudinal) axis X-X' and a rotor unit mounted onto the shaft 1. The reactor 100 further comprises at least one drive engine unit 1C (see FIGS. 8A-8C). The reactor 100 can utilize various drive engines, such as electric motors, or it can be directly driven by gas- or steam turbine. A suitable coupling 1A is arranged between a drive shaft 1B and the rotor shaft 1 (see FIGS. 8A-8C). Flexible and rigid (non-flexible) shaft couplings 1A can be utilized depending on configuration. The rotor shaft 1 is supported by related bearing components discussed further below.

The rotor unit comprises a plurality of rotor blades 3 (also referred to as working blades) arranged over the circumference of a disk 3a mounted onto the rotor shaft 1. Together, said plurality of rotor blades arranged on the disk establishes a rotor blade assembly or a rotor blade cascade (a rotor cascade 3). The rotor blades 3 can be configured with axial flow blade profiles, wherein the term "axial flow" generally indicates that the process fluid enters the rotor blade cascade from a direction essentially perpendicular to the direction of rotation of the rotor. Each rotor blade has a side surface with a concave curvature (a concave side) and a side surface with a convex curvature (a convex side). In the rotor cascade, the working blades are mounted on the rotor disk with the concave side of each blade arranged in the direction of rotor rotation, as indicated by an arrow shape on FIG. 1. In each working blade (top profile, as viewed on FIG. 1), direction from the convex side to the concave side is the direction of the rotor rotation. By way of example, rotor blades can be configured with supersonic turbine blade profiles.

The term "cascade" (a crown of blades/vanes) refers to an ensemble of (working) blades or (stationary) vanes installed over a periphery of a rotor disk or on a ring-shaped support or a casing.

The reactor 100 further comprises a stationary component. Stationary component is represented by a plurality of stationary (stator) vanes 2, 4 arranged into essentially annular assemblies or cascades (stator cascades 2, 4) at both sides of the bladed rotor disk. A first stator cascade 2 is thus disposed upstream the rotor blade cascade 3 and a second stator cascade 4 is disposed downstream the rotor blade cascade.

The terms "upstream" and "downstream" refer hereby to spatial and/or functional arrangement of structural parts or components with relation to a predetermined part- or component, hereby, the rotor disk with associated blade cascade, essentially in a direction of fluidic flow throughout the reactor (along the axis X-X', as shown on FIGS. 6A, 8A-8C and 9, for example).

Stationary vane cascades are adjacently disposed with regard to the rotor blades such, as to form a stator-rotor-stator arrangement (SRSA) 2, 3, 4. Where the reactor operates in design conditions, the distances between the rotor and stator components in the SRSA can be essentially the same.

The cascade arranged upstream the rotor disk comprises a plurality of nozzle guide vanes (NGV), also referred to as nozzle vanes. Said vanes form an annular nozzle guide vane cascade 2. The cascade arranged downstream the rotor disk comprises a plurality of diffuser vanes, also referred to as exit guide vanes, which form the annular diffuser cascade (a diffuser).

The first- and second stationary vanes 2, 4 have curved profiles preferably adjusted for supersonic flow velocities through associated cascades. In the reactor 100, the stationary vanes are installed with the convex side of each vane arranged in the direction of rotor rotation. In each stationary vane (top profile, as viewed on FIG. 1), direction from the concave side to the convex side is thus the direction of the rotor rotation.

The reactor 100 further comprises a casing 6, in where an interior passageway is established in the form of a duct with at least one inlet 8 and at least one exit 9. For the purposes of the present invention, the casing 6 is viewed as a stationary component. In present context, the term "stationary" is used in a meaning of "non-rotating"; not excluding a possibility for (axial) displacement, as elucidated further below.

FIG. 6A shows a reactor configuration with two inlets 8A, 8B and two exits 9A, 9B; other configurations may be conceived where appropriate. By way of example, the reactor may include one inlet and one exit; one inlet along with two exits or two inlets along with one exit. A reactor with greater number of inlets and/or exits may be implemented. The inlet(s) and exit(s) comprise a related opening/port in the casing 6 and pipes, sleeves or manifolds associate with each said port.

The casing 6 is configured to substantially fully enclose the periphery of the rotor disk with working blades assembled thereon and stationary vane cascades 2, 4 that adjoin the rotor blades and together form the stator-rotor-stator arrangement 2, 3, 4. The casing 6 has an essentially toroid shape (a "doughnut" shape) in three-dimensional configuration, whereby the rotor system (1, 3A, 3) with related bearing assemblies may be viewed as filling up an aperture defining an opening in the central part of the toroid shape. The toroid-shaped structure is further referred to as a gas casing. At its meridional cross-section, the gas casing 6 is essentially ring-shaped.

The reactor further comprises a flow-shaping device (a flow-guiding device) 5 arranged inside the gas casing 6. The flow-shaping device 5 can be configured as an internal stationary ring-shaped structure and it accounts for establishing an essentially annular duct inside the casing 6. The device 5 is fixed in the gas casing 6 with appropriate fixtures (not shown). In some configurations, the flow-shaping device 5 is an annular, essentially hollow structure, such as a hoop, for example.

The interior volume of the reactor is defined as a space established between the gas casing 6 (an outer "doughnut") and the internal flow-shaping device 5 (an inner "doughnut").

A substantially annular passage/duct is thus formed between an inner surface of the gas casing 6 and an outer surface of the flow-shaping device 5. This duct has a ring-shaped meridional cross-section, accordingly. The flow-shaping device 5 configured as an internal hoop adjoins the tips of rotor blades (a gap is formed therebetween enabling unhindered rotation of the rotor) and the peripheral portions of stator vanes. In some configurations, the stationary vane cascades 2, 4 can be provided on bearing blocks constituting a bearing system of the rotor discussed further below.

In some other instances, the stator cascades may be assembled on the flow-shaping device 5 in a manner to adjoin the rotor blades 3. Said stator vanes may thus be mounted on the flow-shaping device and/or connected thereto by means of auxiliary arrangements, such as rings, brackets, and the like (not shown). The above-mentioned features are discussed in more detail in publications by Bushuev (U.S. Pat. No. 9,494,038 B2) and Seppälä et al (U.S. Pat. No. 9,234,140) representing the closest state of the art and referenced hereinabove.

In the gas casing 6, the cascades 2, 3, 4 adjoin each other in such a way that a vaneless space 7 is created between an exit from the stator-rotor-stator arrangement (viz. the exit from the diffuser cascade 4) and an entrance into said arrangement (viz. the entrance into the nozzle guide cascade 2). Said vaneless space is formed between an inner surface of the gas casing 6 and the outer surface of the flow-shaping device 5. A majority of chemical reaction(s) that trigger conversion of feedstock(s) into target products occur in said vaneless space.

A number of working cavities is formed in the interior of the reactor by arranging dividing partitions (not shown) in the annular passage/duct described hereinabove. Dividing partitions are arranged in symmetric manner with regard to the axis of rotation of the rotor. Reactor configurations involving e.g. two- or four working cavities may thus be realized. It is preferred that the inlet port(s) is/are arranged after each said dividing partition (in direction of rotor rotation), whereas the exit port(s) is/are arranged before each said dividing partition. In some instances, the annular duct may be implemented undivided.

In the above described configurations, the process fluid flow is set to propagate in the duct forming the interior of the reactor in accordance with a helical trajectory. The cascades 2, 3, 4 that form the stator-rotor-stator arrangement direct the process fluid to repetitively pass through said cascades and through the vaneless space 7, whereby a helical flow path is established in the essentially annular duct between at least one inlet and at least one exit.

In operation, (stationary) nozzle guide vanes 2 are configured to direct the process fluid flow into the rotor cascade. Provided as a stationary structure, the stator does not add energy to the process fluid. However, in terms of profiles, dimensions and disposition thereof around the rotor shaft 1, the nozzle guide vanes are configured to direct the process fluid flow into the rotor cascade in a predetermined direction such, as to control and, in some instances, to maximize the rotor-specific work input capability.

Process fluid flow further enters the plurality of rotor blades 3, which are configured, upon rotation of the rotor, to receive the fluid flow from the stationary vanes 2 and to add mechanical energy to the process fluid by increasing velocity of the fluidic flow stream. Increased flow velocity results in an increase of kinetic energy of the fluid, accordingly. Velocity of the flow stream passing through the stator-rotor-stator arrangement is essentially supersonic.

Stationary vaned diffuser 4 reduces flow velocity of the process fluid, as well as kinetic energy of the stream, whereby fluid enters the vaneless space 7 at subsonic speed.

During time of residence inside the reactor 100, the process fluid passes through the cascades 2, 3 and 4 several times and each time while passing through the rotor blade cascade 2 the process flow stream is accelerated, thus receiving kinetic energy dissipated into the internal energy of the reacting (process) fluid(s) upon propagating though the diffuser 4 and the vaneless space 7, thus providing the thermal energy required for breaking down chemical bonds between long carbon-hydrogen (C—H) chains. An increase in the internal energy of the fluid results in a rise of fluid temperature. Therefore, high molecular weight compounds occurring in the process fluid are effectively size-reduced.

A process stage configured to mediate a complete energy conversion cycle is thus established upon the process fluid flow stream propagates through the stationary nozzle guide vane cascade 2, the rotor blade cascade 3, the stationary diffuser vane cascade 4 and arrives into the vaneless space 7. During the energy conversion cycle mechanical energy of the fluid is converted into kinetic energy and further—into internal energy of the fluid, followed by the rise of fluid temperature and occurrence of chemical reactions in said fluid.

During time of residence inside the reactor 100, the process fluid passes the cascades and the vaneless space following the helical path, thereby a number of process stages (typically 5-10) is established during one process cycle. The process cycle is defined by a time period during what the flow particles are transferred with the process stream from the inlet 8 to the exit 9 from the reactor accompanied with conversion of feedstock compounds into the target products. Pyrolysis processes, including (steam) cracking processes, require high temperature and are highly endothermic, therefore, the reactions are carried out at high temperatures (750-1000° C., typically 820-950° C.) with residence time in the reaction zone being in scale of fractions of seconds, such as about 0.5-0.1 and down to 0.03-0.01 seconds (30-10 milliseconds). For the sake of completeness, we note that the feedstock-containing process fluid that enters the reactor is preheated to about 500-600 deg C.

Residence time affects the ratios of primary to secondary products at a constant temperature. Thus, with short residence times, primary reactions resulting in formation of the target products, such as light olefins obtainable upon steam cracking, dominate; whereas longer residence times lead to an increase in secondary reactions, resulting in coke formation.

Overall, the reactor 100 is configured, in terms of its geometry and the stator- and rotor related parameters, to establish conditions for at least one chemical reaction to occur in the process fluid.

Upon propagating through the reactor along the helical path in above described manner, the feedstock(s) contained in the process fluid entering the reactor undergoes transformation to form target products that exit the reactor with fluidic outflow. During the process cycle, the process conditions may require adjustment to promote primary reactions resulting in formation of said target products while avoiding or at least minimizing secondary reactions that typically result in coke formation.

Present invention is based on an observation that upon adjusting position of the rotor blade cascade 3 relative to stationary vane cascades 2, 4 in the stator-rotor-stator arrangement in an axial direction of the rotor shaft (viz. in a longitudinal direction of the rotor shaft 1 along the axis X-X'), flow losses, in particular, flow leakages generated in circumferential direction upon rotation of the rotor, can be regulated with high efficiency.

The inventive concept is thus based on adjusting a distance between the rotor blade cascade 3 and stationary vane cascades 2, 4 along the longitudinal direction of the axis (X-X') defined by the rotor shaft. In some configurations position of the rotor blade cascade relative to stationary vane cascades can be adjusted through rendering the rotor displaceable in the axial direction (see FIGS. 8A, 8B, 9).

In some alternative configurations, position of the rotor blade cascade relative to stationary vane cascades can be adjusted through axial displacement of the stationary component or components. In some embodiments, the displaceable stationary component is the reactor casing 6 (see FIG. 8C).

In the rotary machine-type reactors described by Bushuev and Seppala et al in related patent publications, in most instances, changes in any one of: feedstock composition, feedstock consumption rate, apparatus- and/or process-related parameters (e.g. rotational speed of the rotor, temperature, pressure, and the like) cause fluctuations in fluidic flow propagating through the reactor and formation of leakages along a circumferential direction. In particular, the leakages are formed in the directions from inlet to exit or from the end of the reaction zone to the beginning of the adjacent reaction zone. For example, raising the process temperature (with chemical composition of the feedstock-containing process fluid and its mass flow rate being essentially constant) is typically associated with a need to increase rotational speed of the rotor. However, this causes flow leakages from the end of the reaction zone back to the beginning of the adjacent reaction zone (see also FIG. 3B), which, in turn, may cause coke formation and drastically reduce the yield of target products.

Reference is made back to FIG. 1, showing the arrangement of the stator vanes 2, 4 with regard to the rotor blades 3 in the reactor 100 operating under design condition. Design operating mode involves spinning the rotor at a design rotational velocity U, (also referred to as peripheral (circumferential) or tangential velocity. Direction of rotation of the rotor around the rotor axis is indicated by an arrow shape. For the sake of completeness, velocity is defined as speed with respect to direction, otherwise the terms "velocity" and "speed" are used interchangeably.

FIG. 1 shows velocity triangles for fluid flow exiting the nozzle guide cascade 2 and entering the rotor cascade 3 ($V_1$, $W_1$, $\alpha_1$, $\beta_1$) and the same for fluid flow exiting the rotor cascade and entering the diffuser cascade 4 ($V_2$, $W_2$, $\alpha_2$, $\beta_2$), wherein V is absolute velocity of the fluid flow, W is relative velocity of the fluid flow, $\alpha_1$ (alpha 1) is an angle at which the absolute fluid flow ($V_1$) enters the rotor blades, $\alpha_2$ (alpha 2) is an angle at which the absolute fluid flow ($V_2$) enters the stationary diffuser vanes, $\beta_1$ (beta 1) is an angle at which the relative fluid flow ($W_1$) enters the rotor blades, and $\beta_2$ (beta 2) is an angle at which the relative fluid flow ($W_2$) exits the rotors blades and enters the stationary diffuser vanes.

Entrance (inlet) to the blade/vane cascade is generally defined with leading edges of related blades/vanes, whereas the exit from the cascade is defined with trailing edges of said blades/vanes. The entrance and exit are defined in the direction of fluid flow.

FIGS. 2-5 schematically illustrate stator-rotor-stator arrangements in the reactor 100 operating, at least partially, under off-design conditions. Velocities $W_1$ and $V_2$ are indicated by dashed arrows.

A reactor operating under design conditions (a so-called design model) is defined as a reactor having its geometries designed and optimized so, as to realize in practice the predetermined input-related conditions, wherein the inputs may relate to the state of the process fluid (its pressure, temperature, mass flow rate), the system (speed of the rotor, external temperature adjustment, etc.) and/or feedstock (predetermined load rate, chemical composition etc.).

An off-design condition is referred to as a condition, where the inputs used in practice differ from the inputs the system has been designed to work on. Off-design operation may be characterized by operation at temperatures, pressure and/or mass-flow rates different from the design-point parameters, by operating the system at varying loads and/or with different feedstocks.

FIG. 2A shows velocity triangles under operating conditions involving rotational speed (U') of the rotor lower than the same (U) in design mode; whereas FIG. 3A shows velocity triangles under operating conditions involving the rotational speed (U') of the rotor higher than rotational speed (U) in design mode.

FIG. 4A shows velocity triangles under operating conditions involving rotational speed (U) of the rotor in design mode, but upon increased flow rate (hereby, mass flow rate, involving greater consumption of feedstock materials flowing though the reactor). In such an event, the absolute velocity of the fluid flow ($V_1'$) exiting the nozzle guide cascade and entering the rotor cascade will be greater than the same ($V_1$) in design mode.

Accordingly, FIG. 5A shows velocity triangles under operating conditions involving rotational speed (U) of the rotor in design mode, but upon reduced flow rate (hereby, mass flow rate, involving lower consumption of feedstock materials flowing though the reactor). In such an event, the absolute velocity of the fluid flow ($V_1'$) exiting the nozzle guide cascade and entering the rotor cascade will be lower than the same ($V_1$) in design mode.

FIGS. 2-5 thus show velocity triangles obtainable for fluid flow exiting the nozzle guide cascade and entering the rotor cascade ($V_1'$, $W_1'$, $\alpha_1'$, $\beta_1'$) and the same for fluid flow exiting the rotor cascade and entering the diffuser cascade ($V_2'$, $W_2'$, $\alpha_2'$, $\beta_2'$) in the reactor 100 operating under off-design conditions, the latter being different from design conditions, wherein V' is absolute velocity of the fluid flow, W' is relative velocity of the fluid flow, $\alpha_1'$ (alpha 1') is an angle at which the absolute fluid flow ($V_1'$) enters the rotor blades, $\alpha_2'$ (alpha 2') is an angle at which the absolute fluid flow ($V_2'$) exits the rotors blades and enters the stationary diffuser vanes, $\beta_1'$ (beta 1') is an angle at which the relative fluid flow ($W_1'$) enters the rotor blades, and $\beta_2'$ (beta 2') is an angle at which the relative fluid flow ($W_2'$) exits the rotors blades and enters the stationary diffuser vanes.

Fluid flow related parameters for operating the reactor 100 in design mode (U, V, W, $\alpha$, $\beta$) and in off-design mode (U', V', W', $\alpha'$, $\beta'$) are presented in Table 1.

TABLE 1

Comparison of fluid flow related parameters in design- and off-design conditions (FIGS. 2-5).

Figure 2:
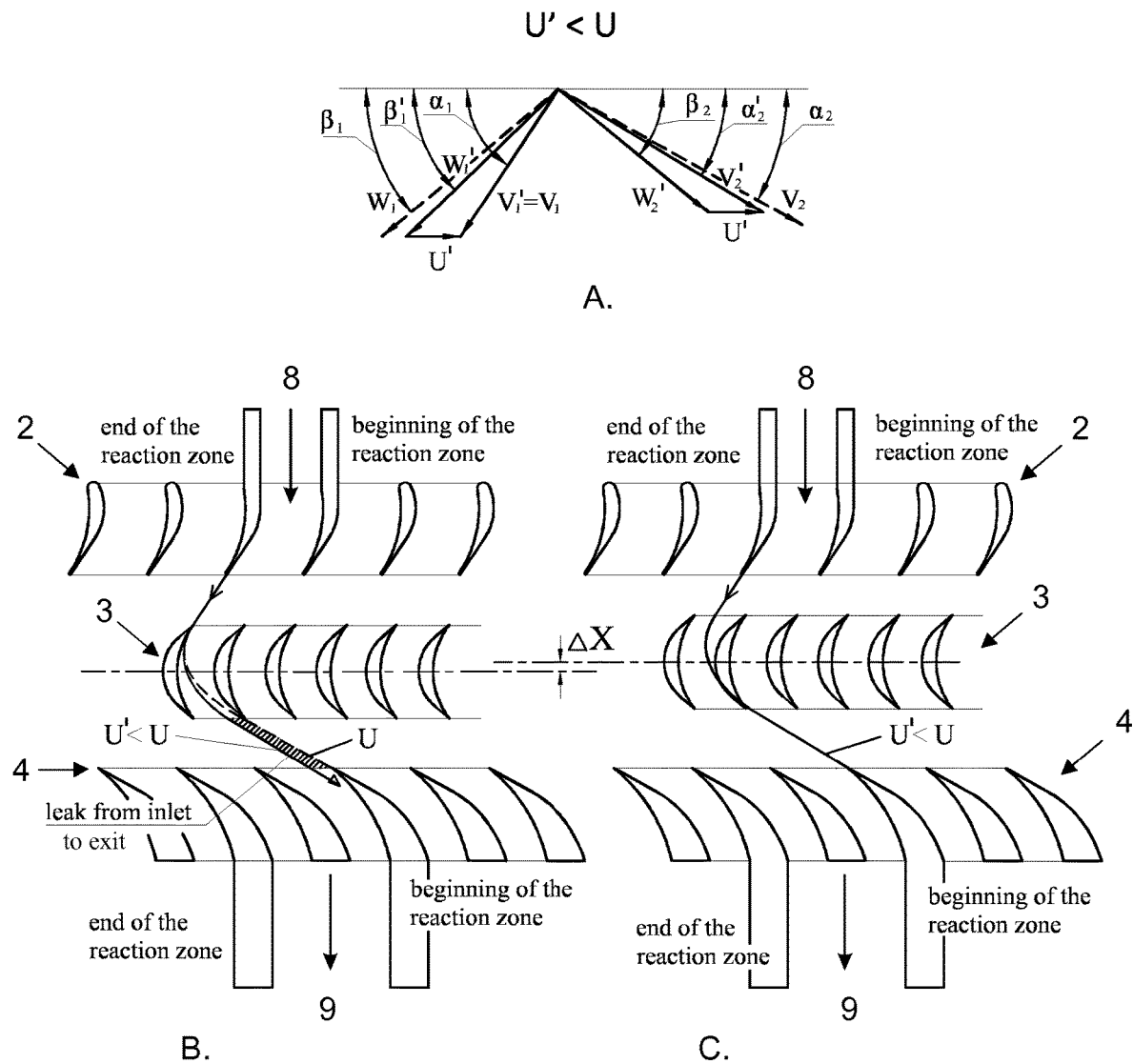
FIGS. 2-5 show velocity triangles and the stator-rotor-stator arrangements in the apparatus 100 operating, at least partially, under off-design conditions and having the rotor displaced relative to the stator element by a predetermined distance $\Delta X$, according to embodiments.
Figure 3:
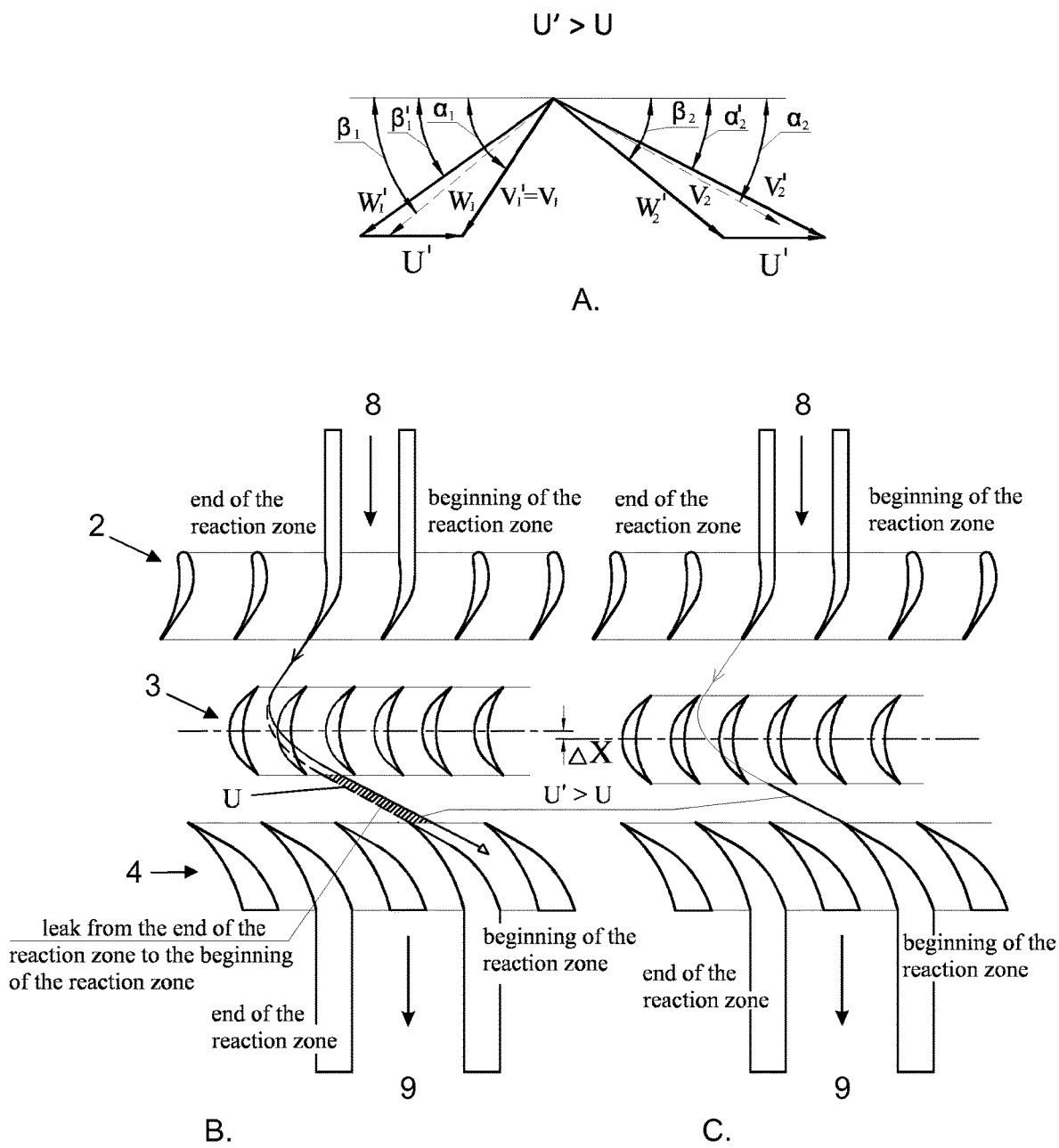
Figure 4:
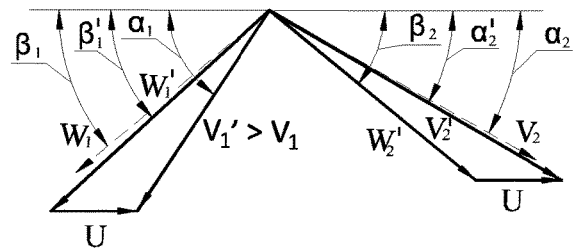
Figure 4:
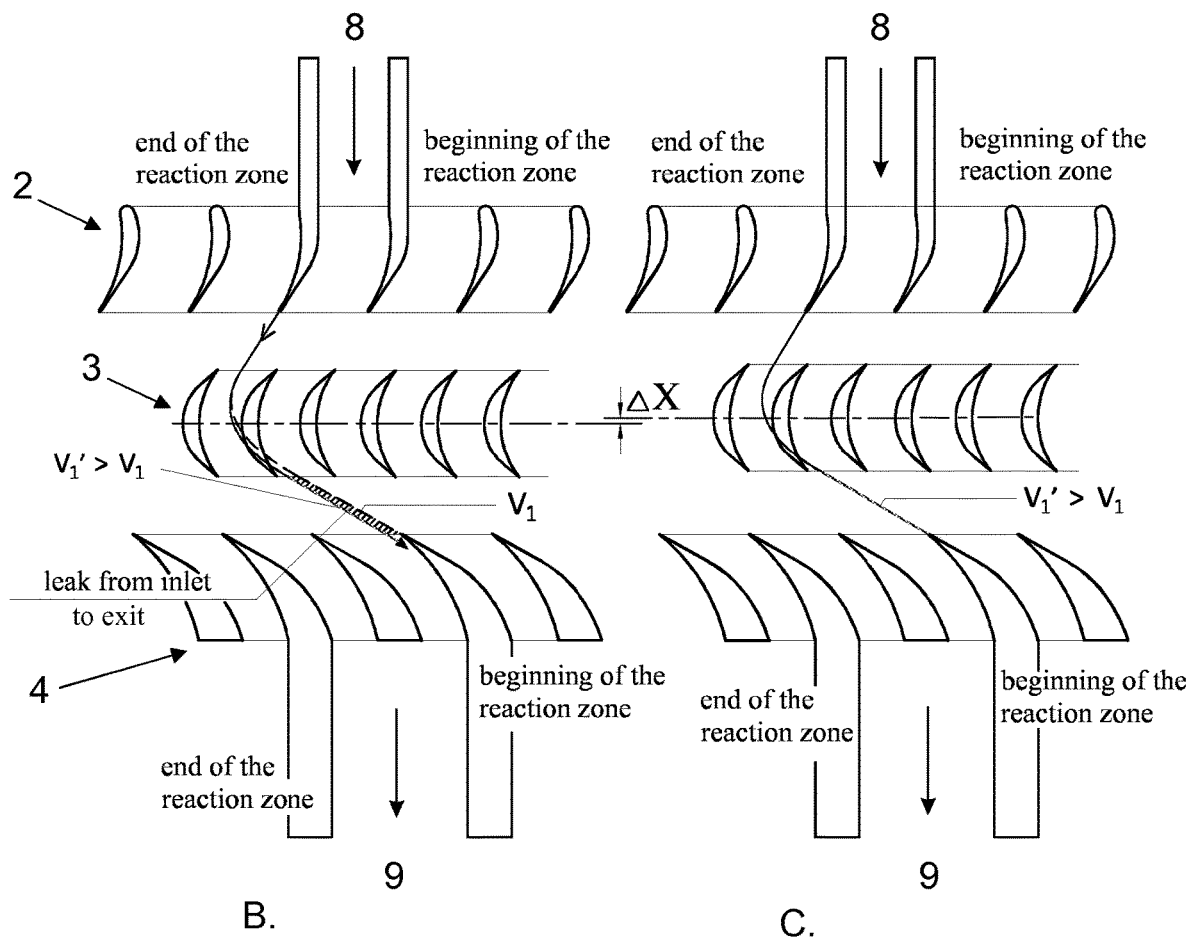
Figure 5:
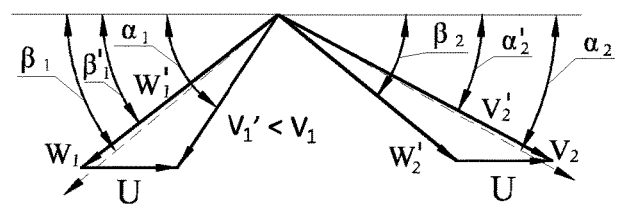
Figure 5:
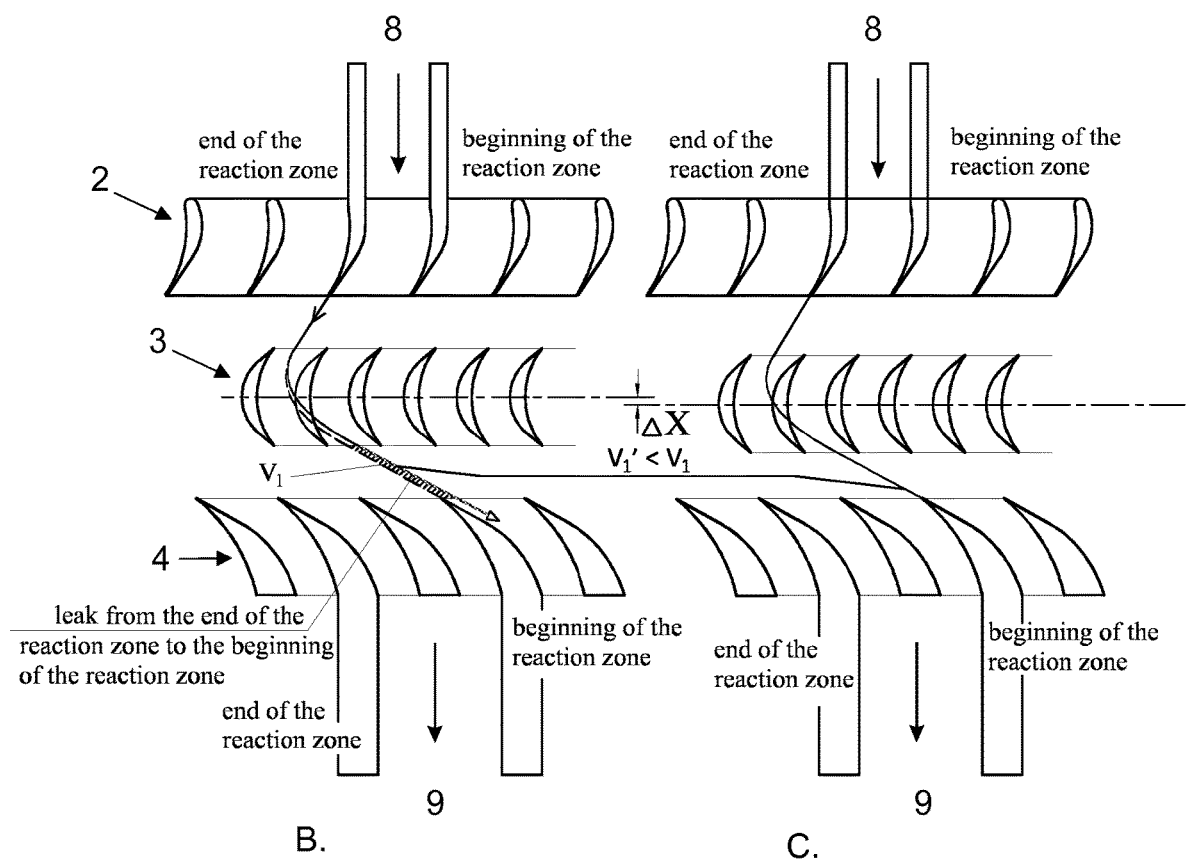

| Parameter | FIG. 2 | FIG. 3 | FIG. 4 | FIG. 5 |
|---|---|---|---|---|
| U' - peripheral speed of the rotor | U' < U | U' > U | U' = U | U' = U |
| Parameters related to fluid flow entering the rotor cascade | | | | |
| $V_1'$ - absolute velocity of the fluid flow exiting the nozzle guide cascade | $V_1' = V_1$ | $V_1' = V_1$ | $V_1' > V_1$ | $V_1' < V_1$ |
| $\alpha_1'$ - angle at which the absolute fluid flow ($V_1'$) enters the rotor cascade | $\alpha_1' = \alpha_1$ | $\alpha_1' = \alpha_1$ | $\alpha_1' = \alpha_1$ | $\alpha_1' = \alpha_1$ |
| $W_1'$ - relative velocity of the fluid flow | $W_1' < W_1$ | $W_1' > W_1$ | $W_1' > W_1$ | $W_1' < W_1$ |
| $\beta_1'$ - angle at which the relative fluid flow enters the rotor cascade | $\beta_1' > \beta_1$ | $\beta_1' < \beta_1$ | $\beta_1' > \beta_1$ | $\beta_1' < \beta_1$ |
| Parameters related to fluid flow exiting the rotor cascade | | | | |
| $W_2'$ - relative velocity of the fluid flow | $W_2' < W_2$ | $W_2' > W_2$ | $W2' > W_2$ | $W_2' < W_2$ |
| $\beta_2'$ - angle at which the relative fluid flow ($W_2'$) exits the rotors cascade | $\beta_2' = \beta_2$ | $\beta_2' = \beta_2$ | $\beta_2' = \beta_2$ | $\beta_2' = \beta_2$ |
| $V_2'$ - absolute velocity of the fluid flow entering the diffuser cascade | $V_2' < V_2$ | $V_2' > V_2$ | $V_2' > V_2$ | $V_2' < V_2$ |
| $\alpha_2'$ - angle at which the absolute fluid flow ($V_2'$) enters the diffuser cascade | $\alpha_2' > \alpha_2$ | $\alpha_2' < \alpha_2$ | $\alpha_2' > \alpha_2$ | $\alpha_2' < \alpha_2$ |

Based on velocity triangles (FIGS. 2-5 A), process fluid flow propagation paths (streamlines) through the rotor blades have been generated in the reactor entrance region (inlet 8) and the reactor exit region (exit 9).

FIGS. 2-5 B, C demonstrate the effects of axial displacement of the rotor on regulating flow leakages in the reactor operating under off-design conditions. Similar provisions apply, when the distance between the rotor cascade and the stationary cascades in the stator-rotor-stator arrangement is altered through axial displacement of the casing.

FIG. 2B shows a flow propagation path at a design rotational speed (U; related streamline is shown by dashed line) and at an off-design rotational velocity (U'), wherein the off-design rotational velocity is lower than design rotational velocity (related streamline is indicated by: U'<U). From FIG. 2B it can be observed that, at reduced rotational velocity U', a part of the flow stream propagates from the reactor inlet 8 directly to the exit 9 from the reactor.

As viewed from FIG. 2B, reducing rotational velocity of the rotor causes leakages in the inlet-to-exit direction, where some part of the process stream does not enter the reaction zone. In pyrolysis reactions, this naturally results in reduced yields of the primary (target) products. Rotational velocity of the rotor is typically lowered down when the temperature in the reactor is reduced. Other process parameters, such as chemical composition of a feedstock-containing process fluid and the mass flow rate of said process fluid through the reactor, are preserved essentially constant.

FIG. 2C illustrates a situation, where the rotor cascade 3 is shifted, by means of shifting the rotor, by a predetermined distance ΔX (delta X), a displacement distance, in a direction of the nozzle guide cascade 2. By displacing the rotor, the associated cascade 3 is displaced, by the distance ΔX, from its original position said cascade occupies in the design mode. Displacement of the rotor occurs in axial direction, along the axis X-X' (see FIGS. 6A, 8A-8C, 9). Displacement magnitude defined by the value ΔX is selected in such a way, that upon shifting the rotor by said value, essentially all flow stream proceeds from the reactor inlet 8 towards the beginning of a reaction zone (at rotational velocity U'<U).

With reference to FIGS. 2-5 and 7, the reaction zone is defined by an area in the duct formed between the gas casing 6 and the flow-shaping device 5, where primary chemical reaction(s) leading to formation of target products occur during a process cycle as defined hereinabove. For the sake of clarity, we note, that a majority of chemical reactions occur in the area/volume occupied by vaneless space.

FIG. 3B shows a flow propagation path at a design rotational velocity (U; related streamline is shown by dashed line) and at an off-design rotational velocity (U'), wherein the off-design rotational velocity is higher than design rotational velocity (see streamline U'>U). From FIG. 3B it can be observed that, at increased rotational velocity U', a part of the flow stream propagates from the end of the reaction zone back to the beginning of the reaction zone.

As viewed from FIG. 3B and reviewed herein above with regard to the rotodynamic apparatuses constituting the state of the art, increasing rotational velocity of the rotor causes leakages in a direction from the end of the reaction zone back to the beginning of the adjacent reaction zone, where the primary products once formed return to the beginning of the reaction zone instead of exiting the reactor. This causes formation of secondary reaction products, such has coke, whereby the yield of the target products is reduced, accordingly. Rotational velocity of the rotor is typically set to greater values when the temperature in the reactor is increased. As in the previous example, the other process parameters, such as chemical composition of the feedstock-containing process fluid and the mass flow rate of said process fluid through the reactor, are preserved essentially constant.

FIG. 3C illustrates a situation, where the rotor is axially displaced, by a predetermined distance ΔX, in a direction away from the nozzle guide cascade 2. The magnitude of this displacement is selected such, that essentially all flow stream from the end of the reaction zone proceeds towards the reactor exit 9 (at rotational velocity U'>U).

FIG. 4B shows a flow propagation path at a design mass flow rate (wherein the flow enters the rotor with absolute velocity $V_1$; related streamline is shown by dashed line) and at an off-design mass flow rate $V_1'$, wherein the mass flow rate through the reactor is increased (see streamline $V_1'>V_1$). In both cases, rotational velocity of the rotor (U) is provided in design mode. From FIG. 4B it can be observed that, at the increased mass flow rate ($V_1'$), a part of the flow stream propagates from the reactor inlet 8 directly to the reactor exit 9.

FIG. 4C illustrates a situation, where the rotor is axially displaced, by a predetermined distance ΔX, in a direction of the nozzle guide cascade 2. The magnitude of this displacement is selected such, that essentially all flow stream proceeds from the reactor inlet 8 to the beginning of the reaction zone (at the mass flow $V_1'>V_1$).

FIG. 5B shows a flow propagation path at a design mass flow rate (wherein the flow enters the rotor with absolute velocity $V_1$; related streamline is shown by dashed line) and at an off-design mass flow rate, wherein the mass flow rate through the reactor is reduced (see streamline $V_1'<V_1$). In both cases, rotational velocity of the rotor (U) is provided in design mode. From FIG. 5B it can be observed that, at reduced mass flow rate $V_1'$, a part of the flow stream propagates from the end of the reaction zone back to the beginning of the reaction zone.

FIG. 5C illustrates a situation, where the rotor is axially displaced, by a predetermined distance ΔX, in a direction opposite the nozzle guide cascade 2. The magnitude of this displacement is selected such, that essentially all flow stream from the end of the reaction zone proceeds towards the reactor exit 9 (at the mass flow $V_1'<V_1$).

As illustrated by FIGS. 2-5 C, the rotor is configured displaceable in the axial direction. Displacement is implemented with regard to the entire rotor by means of a bearing mechanism described further below. Displacement of the rotor causes shifting of a related rotor cascade 3 by a preselected distance ΔX relative to the stationary reactor components.

Displacement distance for the exemplary apparatus 100 may constitute 5-15 mm (see also Example 1). Still, it should be clear that displacement distance magnitude in axial direction may vary depending on size, type, design and/or purpose of the reactor apparatus.

Additional or alternative solution may involve shifting the rotor disc 3A along the rotor shaft 1 (not shown).

In configurations described with reference to FIGS. 2-5, the rotor 3 is configured axially displaceable in direction of the stationary vane cascade disposed upstream the rotor blade cascade (i.e. the nozzle guide vane cascade). This is substantiated by positioning of a displaceable bearing in the vicinity of the rotor drive unit. In reactor described hereby, the disk with associated blade cascade is positioned between the annular vane cascades; therefore, displacement of the rotor cascade towards any of the stationary cascades, alters the original position of the rotor blades with regard to both stator cascades. For the sake of clarity, the stationary vane cascades are not axially displaced.

Hence, in some embodiments, the invention implies adjusting position of the rotor blade cascade 3 relative to stationary vane cascades 2, 4 in the stator-rotor-stator arrangement via provision of the rotor axially displaceable with regard to the stationary component(s) of the reactor (viz., stationary vane cascades 2, 4 and the casing 6) by a predetermined distance (ΔX) in a longitudinal direction of the rotor shaft (X-X').

In some configurations, the rotor is displaced, by a predetermined distance (ΔX), in a longitudinal direction towards the stationary vane cascade 2 disposed upstream the rotor blade cascade 3, upon decreasing rotational velocity (U) of the rotor and/or upon increasing a process fluid flow rate through the reactor. In practice, modified flow rate refers to the modified mass flow rate, as caused by increased consumption of feedstock materials.

In some other configurations, the rotor is displaced, by a predetermined distance (ΔX), in a longitudinal direction away from the stationary vane cascade 2 disposed upstream the rotor blade cascade 3, upon increasing rotational speed of the rotor and/or upon reducing a process fluid flow rate through the reactor. In practice, modified flow rate refers to the modified mass flow rate, as caused by reduced consumption of feedstock materials.

In some embodiments, the distance between the rotor blade cascade 3 and stationary vane cascades 2, 4 along the rotor shaft is adjusted by rendering the stationary component(s) of the reactor displaceable along the rotor shaft. The stationary component(s) is/are displaced along the rotor shaft 1 (in a direction X-X') by a predetermined distance (ΔX). In such an event the rotor remains unshifted. Alternatively, axial movement of the stationary component may be accompanied by axial movement of the rotor.

By way of example, axial displacement of the casing 6 may be accompanied with the axial displacement of at least one stationary vane cascade, e.g. the nozzle guide vane cascade 2, when these elements are built in connection to one another.

Changing position of the rotor blade cascade in the above indicated manner, by shifting the rotor and/or the stationary component, for example, allows for regulating the flow leakages with high precision. Amount and/or direction (inlet-to-exit; end of the reaction zone to the beginning of the adjacent reaction) can be efficiently regulated.

Changes in the (mass) flow and associated feedstock consumption can be further compensated by modifying a feedstock-to-diluent ratio (wherein the diluent is (water) steam, for example), in such a way, that the total flow rate of a feedstock-containing process fluid (viz., a feedstock-diluent mixture) through the reactor is preserved unchanged.

Adjusting position of the rotor blade cascade with regard to stationary vanes through the axial displacement of the rotor, for example, as described above can be implemented in the reactor 100 set into an operative mode or into a non-operative mode. By "operative mode" we refer, in the present context to a condition of the apparatus 100 that arises from its use or application and optionally implies setting the rotor to rotate. Such use may arise during normal operation (implying conducting of chemical reaction(s) in said reaction) or system testing, for example. On the other hand, non-operative mode generally implies that the apparatus 100 is halted or shutdown.

Performing rotor displacement in the reactor set into the non-operative mode is typically implemented when the reactor should be adapted for use with a feedstock different from the one previously used (different in terms of origin and/or varying chemical composition, for example), since such adaptation may require other adjustments in the system.

Displacement of the rotor can be performed having the reactor set into the operative mode. In such an event, axial shifting can be performed manually or in an automated manner, wherein automated adjustment of the axial rotor movement is enabled and controlled by a local or centralized control system (not shown). In some instances, axial displacement may be performed without stopping the rotor from rotating. In such an event it may be advantageous to reduce rotational speed of the rotor.

Similar considerations apply upon axial displacement of the stationary component(s).

Any combination of approaches described hereinabove and aiming at regulating flow losses resulting from the leakages flowing in circumferential direction can be utilized.

Figure 6B:
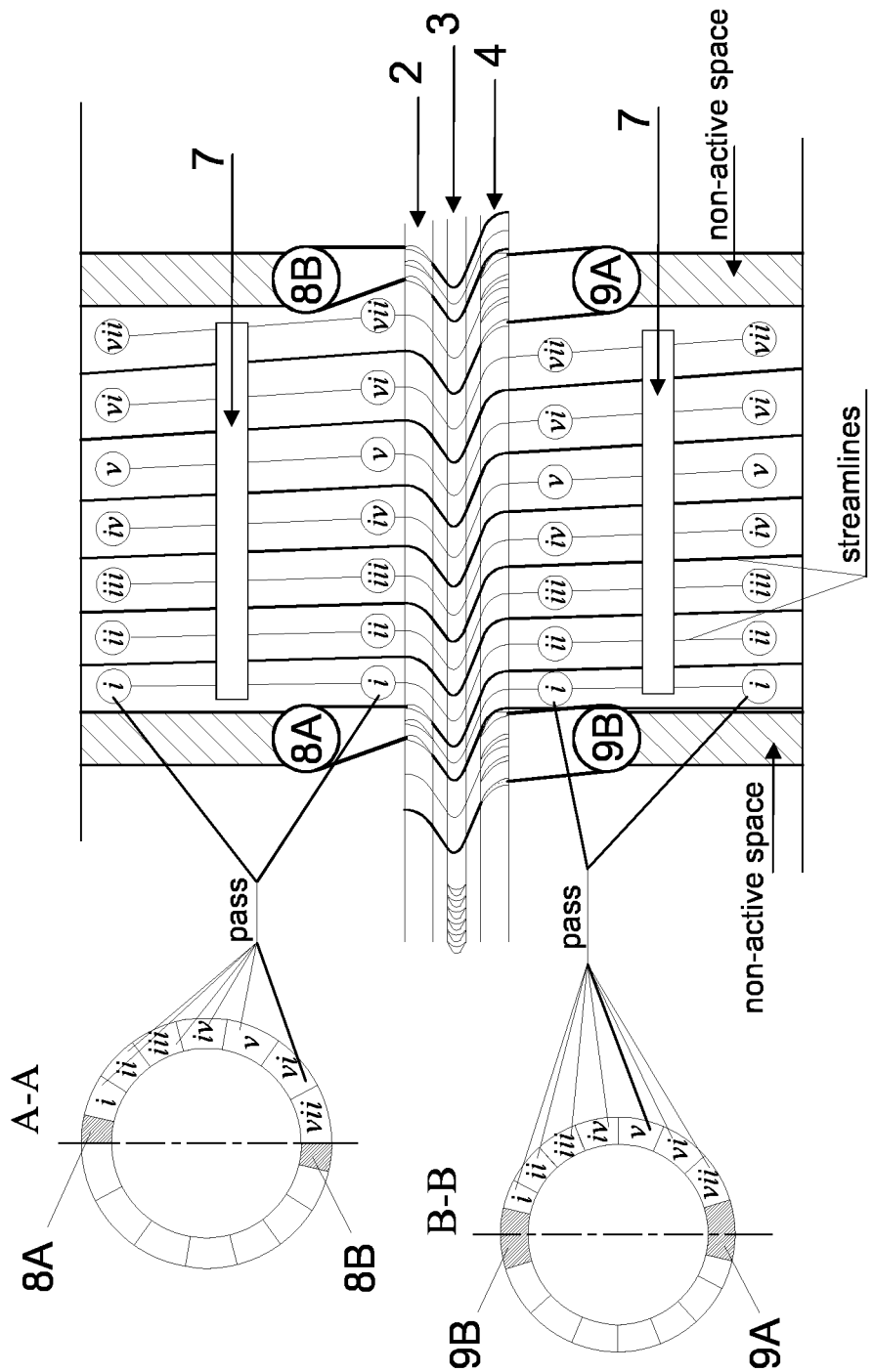
FIG. 6B shows cross-sectional views across lines A-A and B-B designated on FIG. 6A and illustrates a flow diagram for streamline passageways through the apparatus 100.

Reference is further made to FIGS. 6A and 6B, wherein FIG. 6A shows the reactor 100 according to an embodiment, and FIG. 6B shows cross-sectional views across lines A-A and B-B designed on FIG. 6A. Cross-sectional area across the line A-A is located at the entrance (inlet) to the nozzle guide vane cascade 2, whereas the cross-sectional area across the line B-B is located at the exit from the diffuser cascade 4. Overall, crosscuts A-A and B-B depict the events occurring at the inlet to- and exit from the stator-rotor-stator arrangement.

Locations at which the process streamlines enter and exit the reactor interior are designated on the images depicting crosscuts A-A and B-B (FIG. 6B). Additionally, the process streamlines passing through the stator-rotor-stator arrangement 2, 3, 4 generally following the helical pathway are indicated as separate numbered sectorial areas or sectors (see roman numerals i-vii). A flow diagram illustrative of streamline passageways through the reactor is shown on the right. FIG. 6B shows streamlines travelling between a first inlet and a first exit 8A, 9A, accordingly (streamlines travelling between the second inlet 8B and the second exit 9B are not shown).

In operation, the feedstock-containing process fluid flow enters the reactor through the inlet opening 8 (hereby, 8A) and arrives at the first stationary vane cascade 2 (the nozzle guide vane cascade). On the crosscut A-A, the entrance areas within the first stationary vane cascade 2 are shaded (FIG. 6B). Some stationary vanes located at the entrances areas are connected, by dividing partition(s), to the related inlet openings, whereby working cavities are formed between the inlet and the exit.

Fluid flow stream propagates through the stator-rotor-stator arrangement 2, 3, 4, which means, in practice, that the flow stream sequentially propagates through the (stationary) nozzle guide vanes 2, through the (rotating) rotor blades 3 and through the (stationary) diffuser vanes 4; thereafter the flow stream exits the cascade(s) at a sector (i) of the diffuser cascade (crosscut B-B), and flows "upwards" through the vaneless space 7. The flow enters the vaneless space after it has exited the second stationary vane cascade 4 (the diffuser vane cascade).

Each time when the process fluid propagates through the stator-rotor-stator cascades, temperature of the process stream rises thus promoting chemical reaction(s) in the vaneless space arranged downstream of the cascades, as viewed in a direction of fluid flow.

After having passed the vaneless space 7, the flow stream arrives at a sector (i) of the nozzle guide vane cascade 2 (crosscut A-A) and the above described process is repeated. Namely, the fluid flow stream proceeds through the cascades 2, 3, 4, exits at a sector (ii) of the diffuser cascade 4 (crosscut B-B) and continues through the vaneless space 7 towards a sector (ii) of the nozzle guide vane cascade 2 (crosscut A-A), generally following the helical pathway. In configuration presented on FIG. 6B the flow stream propagates through the cascades eight (8) times (to establish 8 stages, accordingly).

After having propagated through the stator-rotor-stator cascades one last time (hereby, eighth time), the flow stream exits the cascades and proceeds to the exit 9 (hereby 9A) from the reactor.

On the crosscut B-B, the exit areas within the second stationary vane cascade 4 are shaded. Some stationary vanes located at the exit areas are connected, by dividing partition(s), to the related exit openings.

Figure 8A:
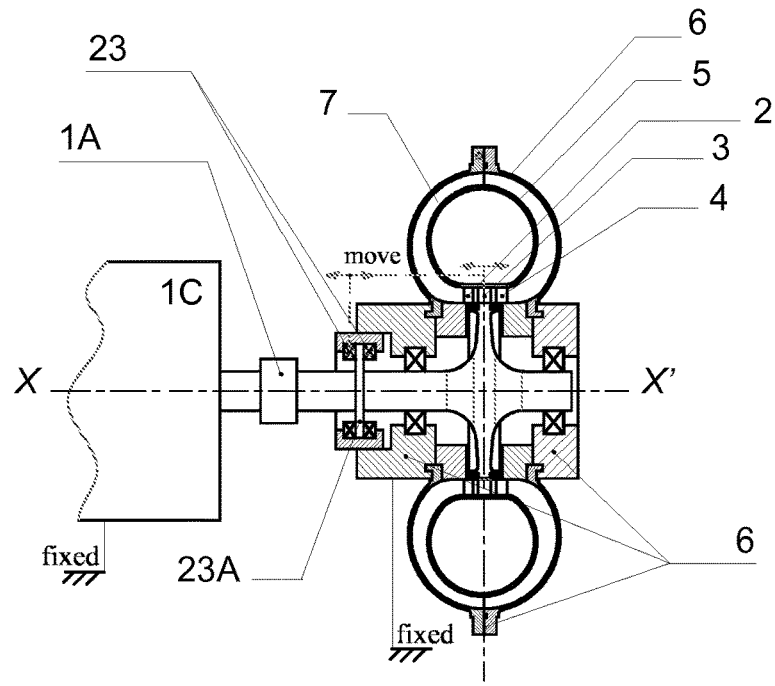
FIGS. 8A-8C show different arrangements for axial rotor displacement, according to the embodiments.
Figure 8B:
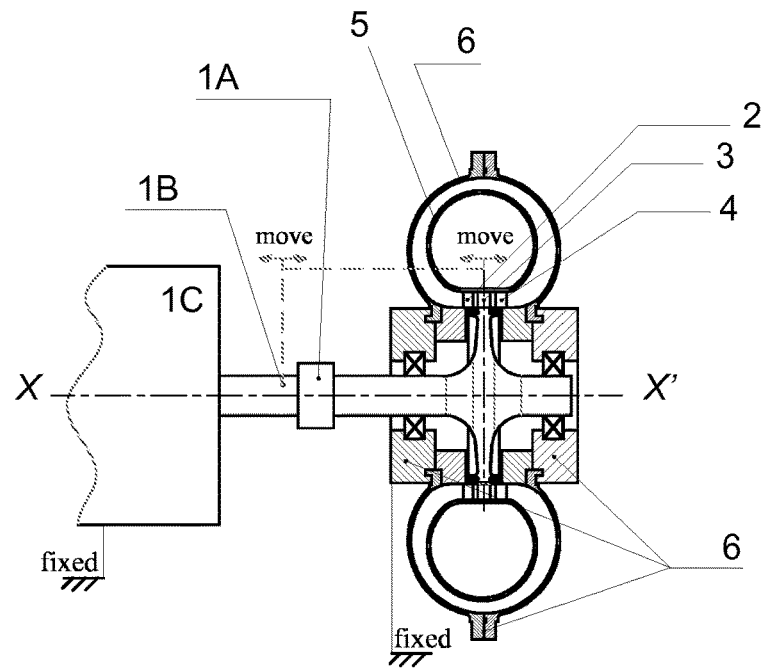
Figure 8C:
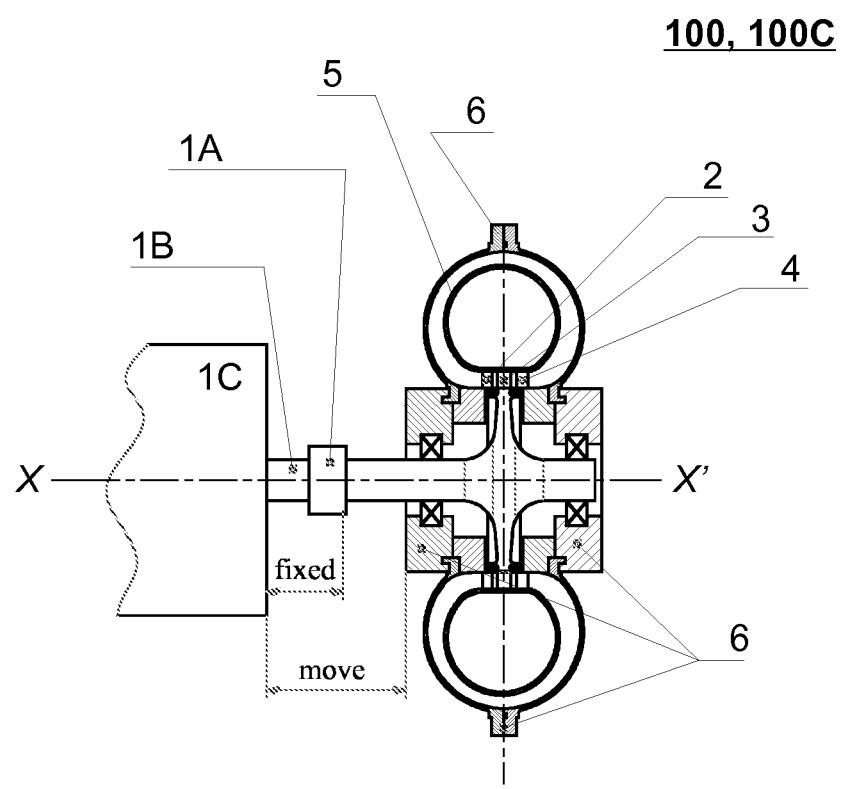

Reference is made to FIGS. 8A-8C schematically illustrating various arrangements for the axial displacement of the rotor (FIG. 8A, 8B) and the stationary component(s) (FIG. 8C).

In all basic embodiments, the reactor 100 comprises the (gas) casing 6 enclosing the rotor cascade 3 and the annular stationary vane cascades 2, 4 provided at either side of the rotor. The flow-shaping device 5 in the form of a hollow hoop is installed within the casing 6, whereby the annular duct is established between the inner surface of the casing 6 and the outer surface of the flow-shaping device 5. A portion of said duct not occupied by vanes/blades forms a vaneless space 7.

The reactor embodied as 100A (FIG. 8A) further comprises at least one thrust bearing element 23 (which can also be referred to as a thrust sliding bearing) arranged on the rotor shaft 1. Thrust bearing(s) support axial loads that act parallel to the axis of the shaft. The thrust bearing element 23 may be configured as hydrodynamic thrust bearing, for example, with a thrust disk 23A fitted between corresponding pads or races. Any other appropriate configuration can be utilized.

The thrust bearing element 23 is configured displaceable along the rotor shaft 1 relative to the stationary components of the reactor, e.g. the casing 6. Hence, in configuration of FIG. 8A, the rotor is rendered axially displaceable through axial displacement of the thrust bearing element 23. In such configuration, the shaft coupling 1A arranged between the rotor shaft 1 and the drive shaft 1B is advantageously configured as a flexible coupling that enables axial displacement of any one of the drive shaft and the rotor shaft (or both) in the axial direction.

FIG. 8B illustrates a configuration 100B, where the rotor is rendered axially displaceable through the axial displacement of the drive shaft 1B (the latter being connected to the rotor shaft 1 via the coupling 1A). The coupling 1A may be provided rigid (preferred) or flexible. Reactor 100B can be implemented without the thrust bearing(s).

In some particular configuration, the reactor 100B is implemented without the thrust bearing, the drive shaft 1B is configured displaceable in the axial direction and the coupling 1A arranged between the drive shaft 1B and the rotor shaft 1 is non-flexible (in the axial direction), i.e. it does not allow for mutual displacement of drive shaft and the rotor shaft.

Configurations 100A, 100B (FIGS. 8A, 8B) feature a fixed stationary component. In particular, the reactor casing is configured still (non-displaceable) with regard to the reactor drive 1C. In both configurations, reciprocal movement of the rotor in the axial direction is enabled.

Figure 9:
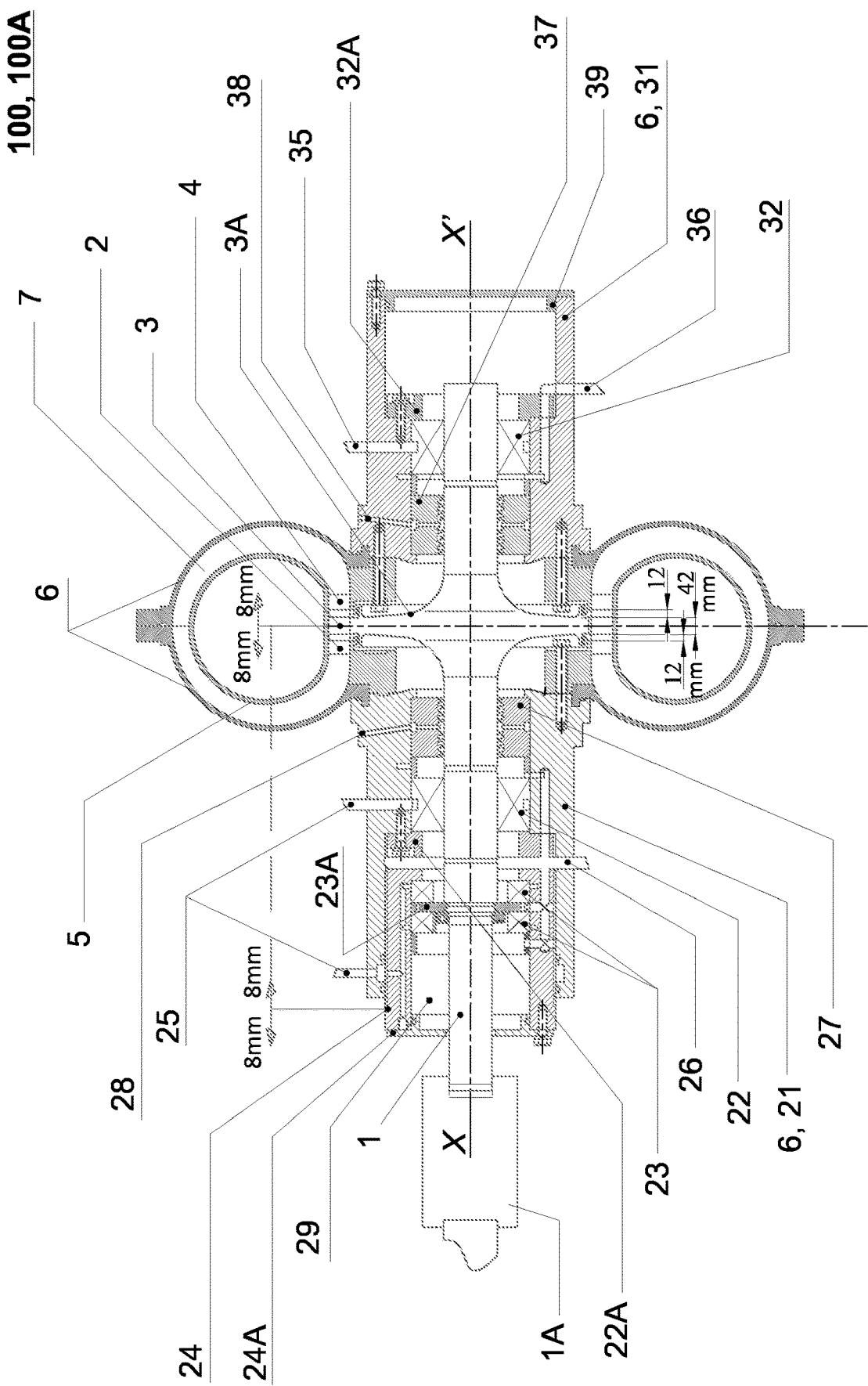
FIG. 9 is vertical crosscut of the apparatus 100 showing an exemplary mechanism for axial rotor displacement.

Configurations 100A, 100B may involve provision of sliding radial bearings (journal bearings), optionally in related blocks, arranged longitudinally on the rotor shaft 1 at the opposite sides of the rotor disk 3A (for details, see description to FIG. 9).

FIG. 8C illustrates a configuration (100C), wherein position of the rotor blade cascade 3 relative to stationary vane cascades 2, 4 in the stator-rotor-stator arrangement is adjustable through axially displacing at least one stationary component, in particular, the reactor casing 6, in a longitudinal direction of the rotor shaft. Displacement of the casing 6 and/or any one of the stationary cane cascades 2, 4 may be mediated by sliding radial bearings 22, 32 (see description to FIG. 9).

Overall, the reactor 100 can be implemented without the thrust bearing(s) 23 (configuration 100C, for example).

In the apparatus 100C the drive shaft 1B is preferably fixed (non-displaceable) in the axial direction. Moreover, the coupling 1A is preferably configured rigid (non-flexible) to render the drive shaft 1B and the rotor shaft 1 axially non-displaceable.

In some particular configuration, the reactor 100C is implemented without the thrust bearing, the drive shaft 1B is configured non-displaceable in the axial direction and the coupling 1A arranged between the drive shaft 1B and the rotor shaft 1 is also non-flexible, whereby axial displacement of drive shaft and the rotor shaft is prevented.

In present disclosure, the gas casing 6 is generally referred to as the reactor casing. Nevertheless, the apparatus structure 100 (100A, 100B, 100C) can be further enclosed into a separate external housing (not shown).

Reference is made to FIG. 9 showing an exemplary mechanism for axial rotor displacement in the reactor 100, said mechanism involving displacement of the thrust bearing. Overall, configuration 100, 100A shown on FIG. 9 is based on that shown on FIG. 8A, therefore, repetitions in describing the basic embodiment are avoided.

In configuration of FIG. 9, the reactor comprises a bearing system comprising radial (sliding) bearing elements 22, 32 and said at least one thrust bearing element 23. In some configurations, the radial bearing elements are journal bearings arranged longitudinally on the rotor shaft 1 at the opposite sides of the rotor disk 3A. Radial bearings support the rotor load that acts perpendicular to the axis of the rotor shaft. Each radial bearing element 22, 32 is fitted in a housing 22A, 32A (a radial bearing housing) and supported with a suitable O-ring seal 39 (another side is not shown).

The at least one thrust bearing 23 is arranged on the rotor shaft to adjoin the radial bearing. Any appropriate radial- (journal-) and thrust bearing configurations can be utilized.

In some configurations, the bearing system is thus implemented with a pair of radial bearings 22, 32, wherein the radial bearing element 22 and the thrust bearing element 23 adjacently arranged on the rotor shaft at one side of the rotor disk are accommodated in a housing 21 and form a first bearing block. The radial bearing element 32 arranged on the rotor shaft at another side of the rotor disk is accommodated in a housing 31 to form a second bearing block. Said bearing blocks are installed at both sides of the gas casing 6.

It is preferred that the thrust bearing element is installed on the rotor shaft in the vicinity of a rotor drive unit (i.e. at that side of the rotor disk coupled to the drive engine).

A bearing block located at a front/entrance end of the reactor (i.e. at the end where the nozzle guide vane cascade 2 is arranged) is referred to as a first bearing block, whereas a bearing block located at a rear/exit end of the reactor (i.e. at the end where the diffuser vane cascade 4 is arranged) is referred to as a second bearing block. Each said first- and the second bearing blocks comprises bearings, optionally, bearing assemblies, fitted in a corresponding housing 21, 31 (a bearing block housing). Mentioned bearing assemblies are configured to absorb radial loads and advantageously also axial (thrust) loads.

In the apparatus of FIG. 9 the thrust bearing element 23 is accommodated in a separate housing 24 (a thrust bearing housing), which is enclosed, at least partly, inside the housing 21 of the related bearing block. A (rotor shaft) end sealing 29 is installed in the thrust bearing housing 24 under a thrust bearing housing cover 24A.

Additionally or alternatively, the thrust bearing may be accommodated in the second bearing block (not shown).

Lubricating oil is supplied to the bearing blocks from an oil system (not shown) via corresponding oil inlet channels 25, 35 in the block housings 21, 31. Oil is drained out of the bearings through the oil outlet channels 26, 36. Separate oil channels (inlet and outlet) are arranged in the thrust bearing housing 24 for lubricating and cooling the latter.

The bearing blocks may further comprise labyrinth seals 27, 37. To avoid contamination of the process fluid and/or generation of excessive heat during the process, liquid-free labyrinth seals, such as gas-labyrinth seals, may be utilized. Steam (water steam) or inert gas, such as nitrogen, for example, may be used to provide the seal. Inert gas is supplied into the labyrinth seals through the channels 28, 38.

In some configurations, each of the stationary vane cascades 2, 4 and optionally the outer casing 6 are secured on the bearing blocks.

The encased (24) thrust bearing element 23 is configured axially displaceable, by a predetermined distance ΔX, in a longitudinal direction of the rotor shaft (along the axis X-X') in the related bearing block. Thrust bearing 23 is displaced relative to the housing 21 of said bearing block. By virtue of being displaceable relative to the bearing block housing, the thrust bearing element 23 is also displaceable relative to the stationary components of the reactor (e.g. the casing 6).

As mentioned above, rotational motion of the rotor is supported by the radial bearings 22, 32 installed along the rotor shaft 1. On the other hand, the thrust bearing element 23 enables axial displacement of the rotor.

Hence, in the embodiment of FIG. 9, the rotor is rendered axially displaceable relative to stationary vane cascades 2, 4 and relative to the gas casing 6 by adjusting position of the encased (24) thrust bearing element 23 in a longitudinal direction of the rotor shaft in the related bearing block relative to the housing 21 of said bearing block. Reciprocal movement of the rotor in the axial direction is thus enabled.

The apparatus 100 can be realized in accordance with the following example.

Example 1. The apparatus 100 comprises the gas casing 6 with two inlets 8A, 8B and two exits 9A, 9B. The casing encloses the rotor 3 and the annular stationary vane cascades 2, 4 fixed at either side of the rotor. The flow-shaping device 5 in the form of a hollow hoop is installed within the casing forming an annular duct, wherein a portion of said duct not occupied by vanes/blades forms a vaneless space 7. The rotor is configured displaceable along the longitudinal axis X-X'. The reactor 100 operates with the parameters defined in Table 2.

TABLE 2

Exemplary parameters related to the rotor blade
cascade 3 and to the process fluid flow.

Parameters related to fluid flow entering the rotor cascade

| | |
|---|---|
| $V_1$ - absolute velocity of the fluid flow | 325 m/s |
| $\alpha_1$ - angle at which the absolute fluid flow ($V_1$) enters the rotor cascade | 30° |
| $W_1$ - relative velocity of the fluid flow | 590 m/s |
| $\beta_1$ - angle at which the relative fluid flow enters the rotor cascade | 16° |

Parameters related to fluid flow exiting the rotor cascade

| | |
|---|---|
| $W_2$ - relative velocity of the fluid flow | 580 m/s |
| $B_2$ - angle at which the relative fluid flow exits the rotors cascade | 28° |
| $V_2$ - absolute velocity of the fluid flow entering the diffuser cascade | 858 m/s |
| $\alpha_2$ - angle at which the absolute fluid flow enters the diffuser cascade | 18.5° |
| U - peripheral rotational speed of the rotor | 285 m/s |
| Size of the rotor blade in axial direction | 42 mm |
| Clearance between the nozzle guide vane cascade and the rotor blade cascade in axial direction | 12 mm |
| Clearance between the rotor blade cascade and the diffuser vane cascade in axial direction | 12 mm |

In the apparatus 100 designed and implemented with the parameters according to Table 2, in order to avoid or at least minimize circumferential flow leakages arising due to decreasing rotational speed U by 25%, the rotor has to be axially displaced in a direction of the nozzle guide vane cascade by a distance $\Delta X$ equal to 6.6 mm.

Figure 7:
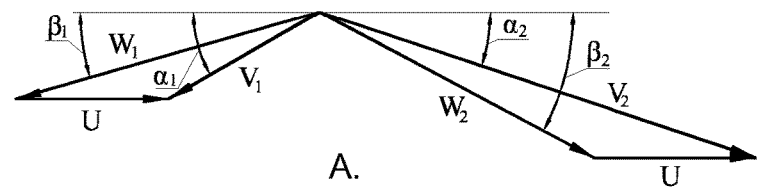
FIG. 7 shows velocity triangles and the stator-rotor-stator arrangement in the apparatus 100 operating in design- and off-design conditions and having the rotor displaced relative to the stator element by a predetermined distance $\Delta X$, according to an embodiment.
Figure 7:
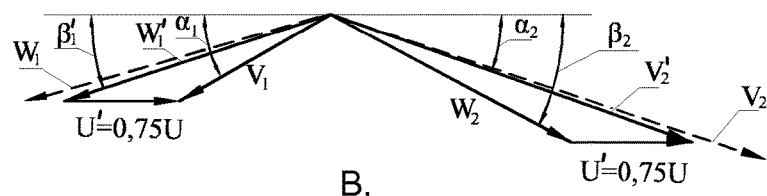
Figure 7:
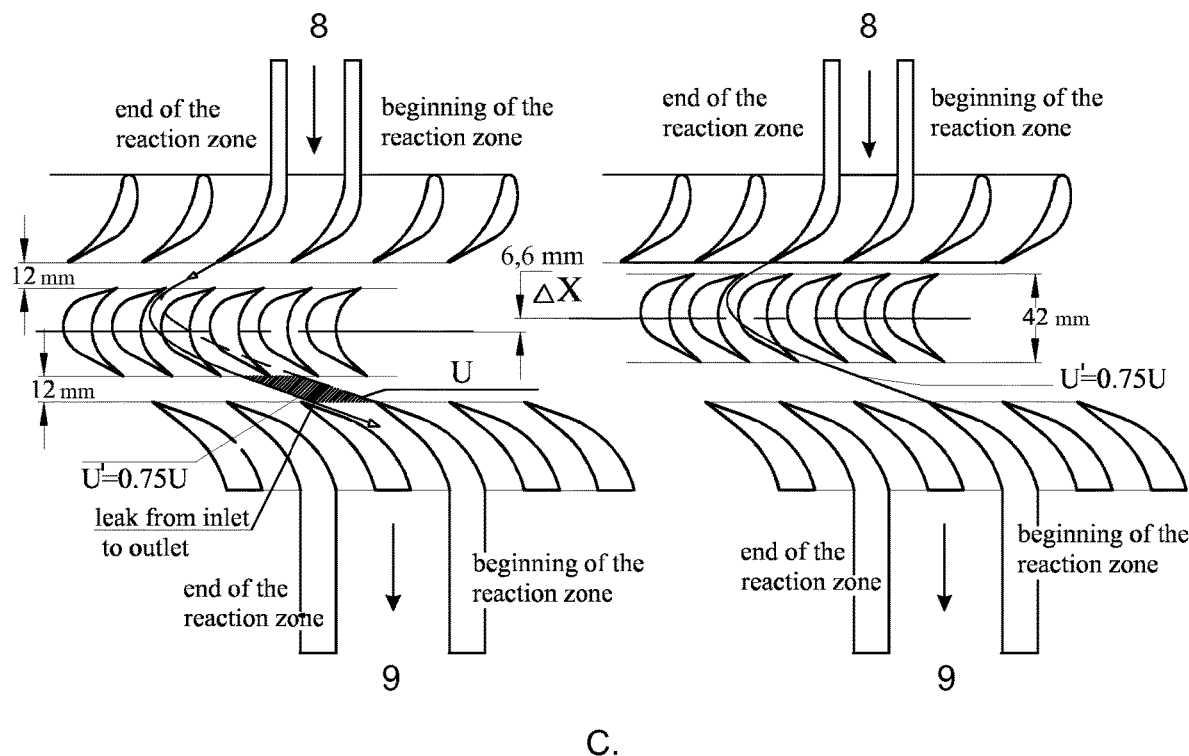

The effects of this displacement are further illustrated by FIG. 7, wherein FIG. 7A shows a velocity triangle obtainable in the reactor 100 under design parameters according to Table 2 (numerical values are given in millimeters).

FIG. 7B shows a velocity triangle under off-design operating conditions that involve reduction of rotational speed U' by 25% in comparison to the rotational speed U in design mode. Velocities $W_1$ and $V_2$ are indicated by dashed arrows.

FIG. 7C shows a situation, wherein the rotor cascade 3 is displaced by the distance $\Delta X$ in the direction of the nozzle guide vane cascade 2. In present case, $\Delta X$=6.6 mm. With selected displacement magnitude, essentially all flow stream that enters the interior of the reactor is forced to beginning of the reaction zone.

The apparatus 100 constructed with blade parameters according to Table 2 is also illustrated by FIG. 9. Note that the displacement distance $\Delta X$ constitutes 8 mm. Where applicable, numerical values on figure(s) are given in millimeters.

In a non-limiting manner, in all configurations described hereinabove, peripheral (rotational) speed of the rotor (U) can be provided within a range of 150-400 m/s. The speed depends on how much energy needs to be supplied to the process flow for a given composition of raw materials.

Size of the rotor blade in axial direction may be provided within a range of 20-90 mm. Clearance between the nozzle guide vane cascade and the rotor blade cascade in axial direction may be provided within a range of 6-40 mm. Overall, dimensions of the rotor blades and stationary vanes, and clearances therebetween depend on size of the reactor 100 and its performance capability, accordingly.

The displacement distance $\Delta X$ in the reactor having specifications as above may vary within a range of about 0.5-25 mm; this range may be extended upon upscaling the device.

Upon connecting the at least two reactor apparatuses 100 in parallel or in series, a reactor arrangement can be established (not shown). Connection between said apparatuses can be mechanical and/or functional. Functional (in terms of chemistry, for example) connection can be established upon association between at least two individual, physically integrated- or non-integrated reactors 100. In a latter case, association between said at least two apparatuses 100 can be established via a number of auxiliary installations (not shown). In some configurations, the arrangement comprises at least two apparatuses that are at least functionally connected via their central shafts. Such configuration can be further defined as having the at least two apparatuses 100 mechanically connected in series (in a sequence), whereas functional (e.g. in terms of feedstock-based reactions) connection can be viewed as connection in parallel (in arrays).

In some instances, the arrangement may further comprise a preheater furnace (hereby, a furnace). Together, the furnace and the at least one reactor 100 may form a cracker unit (not shown). A number of parallel reactors 100 may be connected to a common furnace; or a number of reactors 100 may be connected to several furnaces.

In a further aspect, use of the apparatus 100 and/or the related arrangement is provided for thermal- or thermochemical conversion of hydrocarbon-containing feedstock.

In selected configurations, the conversion is thermal- or thermochemical cracking of said hydrocarbon-containing feedstock, in particular, fluidized hydrocarbon-containing feedstock (viz., fluidized organic feedstock matter that primarily comprises carbon- and hydrogen).

Additionally or alternatively, the reactor 100 can be configured to process oxygen-containing feedstock matter, such as oxygen-containing hydrocarbon derivatives. In some configurations, the reactor 100 can be adapted to process cellulose-based feedstocks. In some additional or alternative configurations, the reactor can be adapted to process (waste) animal fats- and/or (waste) vegetable oil-based feedstocks. Preprocessing of said animal fats- and vegetable oil-based feeds may include hydrodeoxygenation (removal of oxygen from oxygen containing compounds) that results in breaking down (tri)glyceride structures and yields mostly linear alkanes. In further additional or alternative configurations, the reactor 100 can be adapted to process by-products of wood pulp industry, such as tall oil or any derivatives thereof. The definition "tall oil" refers to by-product(s) of the commonly known Kraft process used upon pulping primarily coniferous trees in wood pulp manufacture.

In the process, the hydrocarbon-containing feed is provided as including, but not limited to any one of the following: medium weight hydrocarbons, such as naphthas and gasoils, and light weight hydrocarbons, such as ethane, propane, and butanes. Propanes and heavier fractions can be further utilized.

In some instances, the hydrocarbon-containing feed is a gasified preprocessed biomass material. Biomass-based feed is cellulose-derived or, in particular, lignocellulose-derived preprocessed biomass, supplied into the reactor in substantially gaseous form.

The hydrocarbon-containing feed can be further provided as any one of the preprocessed glyceride-based material, such as (waste or residual) vegetable oils and/or animal fats, or preprocessed plastic waste or residue. Preprocessing of said (tri)glyceride-based feedstocks may include different processes, such as pyrolysis or deoxygenation, as described above. A range of plastic waste comprising PVC, PE, PP, PS materials and mixtures thereof can be utilized in the processes of recovery of pyrolysis oil or gas that can be further used as a feedstock for producing new plastics and/or refined to fuel oil(s) (diesel equivalents).

Hence, in selected embodiments, the reactor 100 an be configured for executing an at least one procedure selected from the group consisting of: processing hydrocarbon feedstock preferably containing medium and light weight hydrocarbon fractions; processing gasified carbohydrate-containing feedstock matter, processing gasified glyceride- and/or fatty acid-containing feedstock matter, and processing gasified cellulosic biomass material. Hereby, the reactor 100 is configurable for processing oxygen-containing feedstock materials derived from bio-based feedstock, for example. Possible application areas include refining of biomass-based or biomass-derived matter to produce renewable fuels in processes such as direct catalytic hydrogenation of vegetable oil or animal fats into corresponding alkanes or catalytic dehydrogenation of gaseous hydrocarbons as one of the stages of Fischer-Tropsch process, for example, for example. Additionally, the reactor may be configured for valorization (enhancement or refinement of gaseous matter) of bio-based pyrolysis gas or syngas.

In an event of utilization of feedstocks based on biomass-, glyceride- and/or polymeric substances, the reactor 100 may be further adapted for catalytic processes. This is achieved by a number of catalytic surfaces (not shown) formed by catalytic coating(s) of reactor blades or internal walls being in contact with process fluid(s). In some instances, the reactor may comprise a number of catalytic modules defined by ceramic or metallic substrate(s) or support carrier(s) with an active (catalytic) coating optionally realized as monolithic honeycomb structures.

In another aspect, a method for improving process efficiency and for regulating flow losses during processing of feedstocks in a process fluid is provided, said method comprises at least the following steps:
a. obtaining an apparatus 100 comprising:
  a rotor comprising a plurality of rotor blades arranged over a circumference of a disk (3a) mounted onto a rotor shaft (1) and forming a rotor blade cascade (3),
  a plurality of stationary vanes arranged into annular vane cascades (2, 4) adjacently disposed with regard to the rotor blade cascade such, as to form a stator-rotor-stator arrangement (2, 3, 4), and
  a casing (6), in which a duct is formed with at least one inlet (8) and at least one exit (9), said casing enclosing the rotor blade cascade (3) and the stationary vane cascades (2, 4) inside the duct; and
b. adjusting position of the rotor blade cascade relative to stationary vane cascades in the stator-rotor-stator arrangement in an axial direction along the rotor shaft by a predetermined distance ($\Delta X$).

The method is particularly advantageous in operating the apparatus 100 in off-design conditions.

In the method, position of the rotor blade cascade relative to stationary vane cascades in said stator-rotor-stator arrangement is adjusted through axially displacing the rotor in a longitudinal direction of the rotor shaft. Alternatively, the stationary component (e.g. the casing) can be displaced. Reciprocal movement of any one of the rotor and the stationary component in a longitudinal direction along the rotor shaft can be enabled.

In some embodiments, adjusting position of the rotor blade cascade relative to stationary vane cascades in the stator-rotor-stator arrangement is accompanied with adjusting at least a rotational velocity of the rotor and/or a flow rate of a feedstock-containing process fluid. In some instances, adjusting flow rate includes adjustment of the mass flow rate, indicative of the total consumption of feedstock materials.

In some embodiments, the rotor is displaced, by a predetermined distance $\Delta X$, in a longitudinal direction towards the stationary vane cascade 2 (the nozzle guide vane cascade) disposed upstream the rotor blade cascade 3, upon decreasing rotational speed of the rotor and/or upon increasing a process fluid flow rate through the reactor 100.

In some other embodiments, the rotor is displaced, by a predetermined distance $\Delta X$, in a longitudinal direction away from the stationary vane cascade 2 disposed upstream the rotor blade cascade 3, upon increasing rotational speed of the rotor and/or upon reducing a process fluid flow rate through the reactor 100.

In the method, position of the rotor and/or the stationary component can be adjusted in the apparatus set into an operative mode or into a non-operative mode.

In the method, the feedstock advantageously comprises hydrocarbons. In some instances the feedstock comprises at least one alkane feed (ethane, propane, butane), naphtha feed, gas oil, and/or any other feed suitable for producing essentially low-molecular weight, preferably unsaturated hydrocarbons, such as olefins (ethylene, propylene, butylene) and acetylene.

It is clear to a person skilled in the art that with the advancement of technology the basic ideas of the present invention may be implemented in various ways. The invention and its embodiments may generally vary within the scope of the appended claims.

The inventon claimed is:
1. An apparatus (100) for processing feedstocks in a process fluid, comprising:
  a rotor comprising a plurality of rotor blades arranged over a circumference of a disk (3a) mounted onto a rotor shaft (1) and forming a rotor blade cascade (3),
  a plurality of stationary vanes arranged into essentially annular vane cascades (2, 4) adjacently disposed with regard to the rotor blade cascade such, as to form a stator-rotor-stator arrangement (2, 3, 4), and
  a casing (6), in which a duct is formed with at least one inlet (8) and at least one exit (9), said casing enclosing the rotor blade cascade (3) and the stationary vane cascades (2, 4) inside the duct,
  wherein position of the rotor blade cascade (3) relative to stationary vane cascades (2, 4) in the stator-rotor-stator arrangement is adjustable in an axial direction along the rotor shaft by a predetermined distance ($\Delta X$).

2. The apparatus (100) of claim 1, wherein position of the rotor blade cascade (3) relative to stationary vane cascades (2, 4) in said stator-rotor-stator arrangement is adjustable through axially displacing the rotor in a longitudinal direction of the rotor shaft.

3. The apparatus (100, 100A) of claim 1, further comprising at least one thrust bearing element (23) arranged on the rotor shaft, wherein the rotor is rendered axially displaceable through axial displacement of said at least one thrust bearing element on the rotor shaft.

4. The apparatus (100, 100A) of claim 3, wherein said at least one thrust bearing element (23) is configured axially displaceable relative to the casing (6).

5. The apparatus (100, 100A) of claim 3, wherein said at least one thrust bearing element (23) is encased in a separate housing (24), which is enclosed, at least partly, inside a bearing block (21), and wherein the at least one encased thrust bearing element (23) and separate housing (24) are configured axially displaceable in a longitudinal direction of the rotor shaft in the related bearing block.

6. The apparatus (100, 100A) of claim 1, wherein a coupling (1A) arranged between the rotor shaft (1) and a drive shaft (1B) is a flexible shaft coupling configured to render the drive shaft and the rotor shaft axially displaceable.

7. The apparatus (100, 100B) of claim 6, wherein the rotor is rendered axially displaceable through axial displacement of the drive shaft (1B) connected to the rotor shaft (1) via the coupling (1A).

8. The apparatus of claim 7, wherein the drive shaft (1B) is fixed, whereby its axial displacement is prevented.

9. The apparatus of claim 7, wherein the coupling (1A) is a rigid shaft coupling configured to render the drive shaft and the rotor shaft axially non-displaceable.

10. The apparatus (100, 100C) of claim 1, wherein position of the rotor blade cascade (3) relative to stationary vane cascades (2, 4) in the stator-rotor-stator arrangement is adjustable through axially displacing at least one stationary component, in a longitudinal direction of the rotor shaft.

11. The apparatus (100,100C) of claim 10, wherein the at least one stationary component is the casing (6).

12. The apparatus (100) of claim 1, wherein each of the stationary vane cascades (2, 4) are secured on related bearing blocks (21, 31) arranged at both sides of the casing (6).

13. The apparatus (100) of claim 1, wherein adjusting position of the rotor blade cascade (3) relative to stationary vane cascades (2, 4) in the stator-rotor-stator arrangement is accompanied with adjusting at least a rotation speed of the rotor and/or a flow rate of a feedstock-containing process fluid.

14. The apparatus (100) of claim 1, further comprising a flow-shaping device (5) arranged inside the casing (6) in such a way that the duct is formed between the casing and the flow-shaping device, said duct has a ring-shaped meridional cross-section.

15. The apparatus of claim 13, wherein the flow-shaping device (5) is an annular, essentially hollow structure.

16. The apparatus (100) of claim 14, in which a vaneless space (7) is formed between an exit from the stator-rotor-stator arrangement (2, 3, 4) and an entrance thereto, said vaneless space (7) being defined by a volume between the casing (6) and the flow-shaping device (5).

17. The apparatus (100) of claim 16, wherein the rotor blade cascades (3) and the stationary vane cascades (2, 4) in the stator-rotor-stator arrangement (2, 3, 4) are configured to direct the process fluid to repetitively pass through said rotor blade cascades (3) and stationary vane cascades (2, 4) and through the vaneless space (7) in accordance with a helical flow path while propagating within the duct between the at least one inlet and at least one exit and to establish conditions for at least one chemical reaction to occur in the process fluid.

18. The apparatus (100) of claim 1, wherein the stationary vane cascades are formed with a plurality of stationary nozzle guide vanes that form an annular nozzle guide vane cascade (2) upstream of the rotor blades and with a plurality of stationary diffuser vanes that form a diffuser vane cascade (4) downstream of the rotor blades.

19. The apparatus (100) of claim 1, configured with a number of catalytic surfaces.

20. An arrangement comprising at least two apparatuses according to claim 1, at least functionally connected in parallel or in series.

21. A method for improving process efficiency and for regulating flow losses during processing of feedstocks in a process fluid, comprising:
   a. obtaining an apparatus (100) comprising:
      a rotor comprising a plurality of rotor blades arranged over a circumference of a disk (3a) adjustably mounted onto a rotor shaft (1) and forming a rotor blade cascade (3),
      a plurality of stationary vanes arranged into annular vane cascades (2, 4) adjacently disposed with regard to the rotor blade cascade such, as to form a stator-rotor-stator arrangement (2, 3, 4), wherein adjusting a position of the rotor blade cascade (3) relative to the stationary vane cascades (2, 4) is configured to adjust at least a rotation speed of the rotor and/or a flow rate of the process fluid, and
      a casing (6), in which a duct is formed with at least one inlet (8) and at least one exit (9), said casing enclosing the rotor blade cascade (3) and the stationary vane cascades (2, 4) inside the duct; and
   b. adjusting a position of the rotor blade cascade (3) relative to the stationary vane cascades (2, 4) in the stator-rotor-stator arrangement in an axial direction along the rotor shaft by a predetermined distance ($\Delta X$), thereby adjusting at least the rotation speed of the rotor and/or the flow rate of the feedstock-containing process fluid.

22. The method of claim 21, wherein position of the rotor blade cascade (3) relative to stationary vane cascades (2, 4) in said stator-rotor-stator arrangement is adjusted through axially displacing the rotor in a longitudinal direction of the rotor shaft.

23. The method of claim 21, wherein position of the rotor blade cascade (3) relative to stationary vane cascades (2, 4) in the stator-rotor-stator arrangement is adjusted through axially displacing at least one stationary component, in a longitudinal direction of the rotor shaft.

24. The method of claim 23, wherein the at least one stationary component is the casing (6).

25. The method of claim 21, wherein adjusting position of the rotor blade cascade (3) relative to stationary vane cascades (2, 4) in the stator-rotor-stator arrangement is accompanied with adjusting at least a rotational velocity of the rotor and/or a flow rate of a feedstock-containing process fluid.

26. The method of claim 21, wherein the rotor is displaced, by a predetermined distance ($\Delta X$), in a longitudinal direction towards the stationary vane cascade (2) disposed upstream the rotor blade cascade (3), upon decreasing rotational velocity of the rotor and/or upon increasing a process fluid flow rate through the apparatus (100).

27. The method of claim 21, wherein the rotor is displaced, by a predetermined distance ($\Delta X$), in a longitudinal direction away from the stationary vane cascade (2) disposed upstream the rotor blade cascade (3), upon increasing rotational velocity of the rotor and/or upon reducing a process fluid flow rate through the apparatus (100).

28. The method of claim 21, wherein adjusting position of the rotor blade cascade (3) relative to stationary vane cascades (2, 4) in the stator-rotor-stator arrangement is implemented in the apparatus set into an operative mode.

29. The method of claim 21, wherein the feedstock comprises hydrocarbons.

30. The method of claim 21, wherein adjusting position of the rotor blade cascade (3) relative to stationary vane cascades (2, 4) in the stator-rotor-stator arrangement is implemented in the apparatus set into a non-operative mode.

* * * * *